United States Patent [19]

Prather et al.

[11] Patent Number: 4,589,106

[45] Date of Patent: May 13, 1986

[54] DATA LINE CARD PRINTED BOARD ASSEMBLY

[75] Inventors: Donald W. Prather, Raleigh, N.C.; Richard G. Sposito, Mansfield, Ohio

[73] Assignee: ITT Corporation, New York, N.Y.

[21] Appl. No.: 642,622

[22] Filed: Aug. 20, 1984

[51] Int. Cl.$^4$ ............................................. H04Q 11/04
[52] U.S. Cl. ......................................... 370/58; 370/60
[58] Field of Search ................. 370/58, 60, 84; 178/3

[56] References Cited

U.S. PATENT DOCUMENTS

| | | | |
|---|---|---|---|
| 4,154,985 | 5/1979 | Munter | 370/84 |
| 4,229,815 | 10/1980 | Cummiskey | 370/84 |
| 4,413,337 | 11/1983 | Dauphin et al. | 370/58 |
| 4,445,213 | 4/1984 | Baugh et al. | 370/60 |
| 4,494,231 | 1/1985 | Slawy et al. | 370/60 |

Primary Examiner—Douglas W. Olms
Attorney, Agent, or Firm—John T. O'Halloran; Thomas F. Meagher

[57] ABSTRACT

The data line card printed board assembly provides an interface between a switching system and data terminal equipment operating in a selected one of a synchronous mode, an asynchronous mode and a synchronous polled mode and at a selected one of a plurality of different data rates. This assembly comprises a first arrangement coupled to the switching system to provide a first bidirectional communication path between the switching system and the data line card and a second arrangement coupled to the first arrangement and the data terminal equipment to provide the first bidirectional communication path between the first of the data terminal equipment and the data line card card. A computer arrangement diposed on the printed board assembly is coupled to the first and second arrangement for bidirectional control thereof to accommodate the selected one of the modes and the selected one of the plurality of different data rates. The assembly further includes a third arrangement coupled to the switching system and the computer arrangement to provide a second bidirectional communication path between the switching system and the data line card with the third arrangement being controlled by the computer arrangement.

42 Claims, 20 Drawing Figures

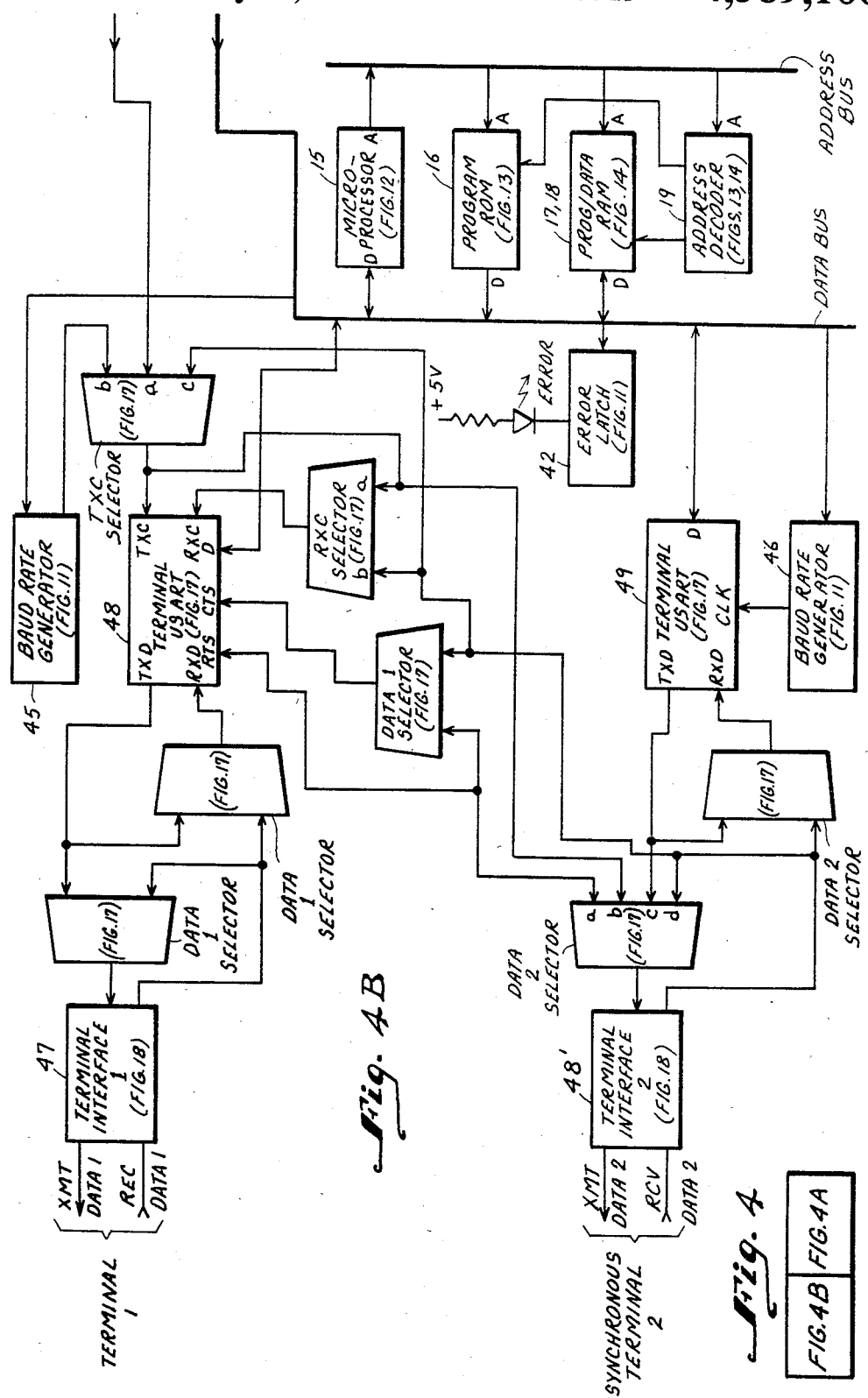

| FIG. 5A |
| FIG. 5B |

DIAGRAM SHOWS CHANNEL 4 ASSIGNED TO LINE 1 AND CHANNEL 5 ASSIGNED TO LINE 2.

DATA LINE CARD PRINTED BOARD ASSEMBLY

BACKGROUND OF THE INVENTION

The present invention relates to interface arrangments and, more particularly to an interface arrangment for providing switched connections between various data sources, such as computers and data terminals.

To permit selective interconnection between data sources, such as computers, data terminals and various peripheral data devices, it has been common practice to either have fixed connections between preselected units or to use patchboard types of arrangments. The use of modems along with fixed or patchboard connections limits the flexibility in utilizing various data handling devices.

Additionally, there is no single uniform standard applicable to all presently available data sources. Data terminals may utilize full or half duplex modes; they may require synchronous or asynchronous operation; they may operate at any one of several data rates; they may utilize different message protocols; and they may utilize bit or byte oriented messages.

SUMMARY OF THE INVENTION

An object of the present invention is to provide an arrangment to provide switched connections between various data sources which provides flexibility not achieveable in the prior art.

Another object of the present invention is to provide a data line card printed board assembly capable of operating with full or half duplex modes; that may operate synchronously or asynchronously; that may operate at any one of several data rates; may utilize any one of different message protocols and may utilize bit or byte oriented messages.

A feature of the present invention is the provision of a data line card printed board assembly to provide an interface between a switching system and data terminal equipment operating in a selected one of a synchronous mode, an asynchronous mode and a synchronous polled mode at a selected one of a plurality of different data rates comprising: first means coupled to the switching system to provide a first bidirectional communication path between the switching system and the data line card; second means coupled to the first means and the data terminal equipment to provide the first bidirectional communication path between a first of the data terminal equipment and the data line card; and computer means disposed on the assembly coupled to the first and second means for bidirectional control of the first and second means to accommodate the selected one of the modes and the selected one of the plurality of different data rates.

Another feature of the present invention is the provision of a data line card printed board assembly which, in combination with the first and second means and the computer means, further includes third means coupled to the switching system and the computer means to provide a second bidirectional communication path between the switching system and the data line card, the third means being controlled by the computer means; and fourth means coupled to the computer means, the third means and the data terminal equipment to provide the second bidirectional communication path between the data terminal equipment and the data line card, tne fourth means being controlled by the computer means, the second bidirectional communiation path being coupled to the first of the data terminal equipment to transmit and receive clocks between the data line card and the first of the data terminal equipment when the first of the data terminal equipment operates in and the computer means is programmed for a selected one of the synchronous mode and the synchronous polled mode and the second bidirectional communication path being coupled to a second of the data terminal equipment to interface the data line card to two of the data terminal equipment when both of the first and second of the data terminal equipment are operating in and the computer means is programmed for the asynchronous mode.

BRIEF DESCRIPTION OF THE DRAWING

Above-mentioned and other features and objects of this invention will become more apparent by reference to the following description taken in conjunction with the accompanying drawing, in which:

FIGS. 4A and 4B, when organized as shown in FIG. 4 is a detailed block diagram of the line logic circuitry of FIG. 3;

DESCRIPTION OF THE PREFERRED EMBODIMENT

Figure 1:
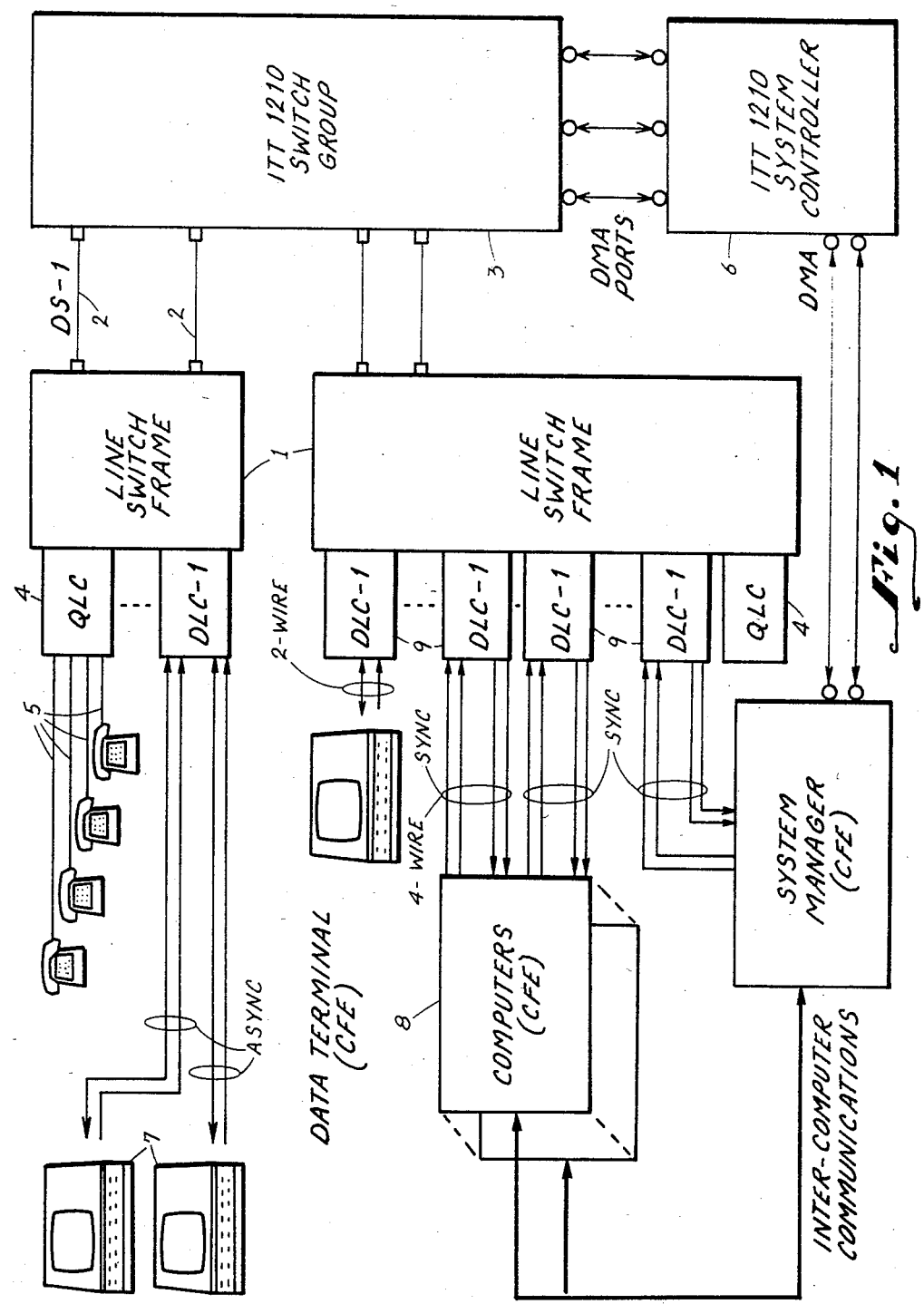
FIG. 1 is a block diagram of a data switching system incorporating the data line card printed board assembly in accordance with the present invention.

Referring to FIG. 1, there is illustrated therein a data switching system in block diagram form incorporating the data line card printed board assembly, referred to hereinafter as DLC-1, in accordance with the principles of the present invention. In the data switching system shown in FIG. 1, advantageous use is made of a telephone switching system of the type utilizing pulse code modulation and time division multiplexing techniques for switching voice signals. In the illustrated embodiment described herein, the System 1210 digital switching system which is commercially available from ITT Corporation is utilized. The System 1210 utilizes three basic building blocks, i.e., line switches, switcn groups and system controller. The line switches are self contained frames 1 accomplishing the standard telephone interface for up to 320 lines each. Each line switch contains terminations for two TI lines 2 coupled to the switching groups 3. Associated with each line 2 is a line switch controller including a microprocessor with random access memory and read only memory. These microprocessors operate independently to service the lines, format the TI bit streams and control and monitor the functions of the line switch. Any line seeking originating or terminating service can be handled by either microprocessor and can be serviced over any time slot (channel) on either TI line.

The actual interface for the subscriber loops are quad line circuits (QLC) cards 4, each providing four lines 5. Among other functions, each QLC provides digital to analog and analog to digital conversion and ring and ring trip control The switch group 3 is a PCM (pulse code modulation) switch which provides time-space-time switching of channels. Each switch group 3 contains its own microprocessor controller which is, in turn, controlled by the system controller 6. Voice paths at 2.048 MBS (megabits per second) bit rate are switched by the switch group 3. Various details of the QLC 4, line switch frames 1, switch group 3 and system controller 6 have been described by N. J. SKAPERDA in "Generic Digital Switching Systems", International Switching Symposium, Vol. 1, October 1976; by C. G. Svala in "DSS-1, A Digital Local Switching System With Remote Line Switches", Proceedings of the National Telecommunication Conference, page 3915-1, 1977; and by F. Fellinger in "Modular Digital Switching Network", International Communications Conference, June 4–7, 1978.

The above-described System 1210 equipment may advantageously be used to provide a data switching system for use with data terminal equipment (DTE). A DTE is defined herein as being any type of digital data terminal including computers. Representative of the DTE which may be connected in the data switching system shown are computer terminals 7 and various computers 8. Interface circuits 9, which are referred to herein as data line circuits, printed board assembly (DLC-1) are utilized to interface the DTE to the System 1210.

Figure 2:
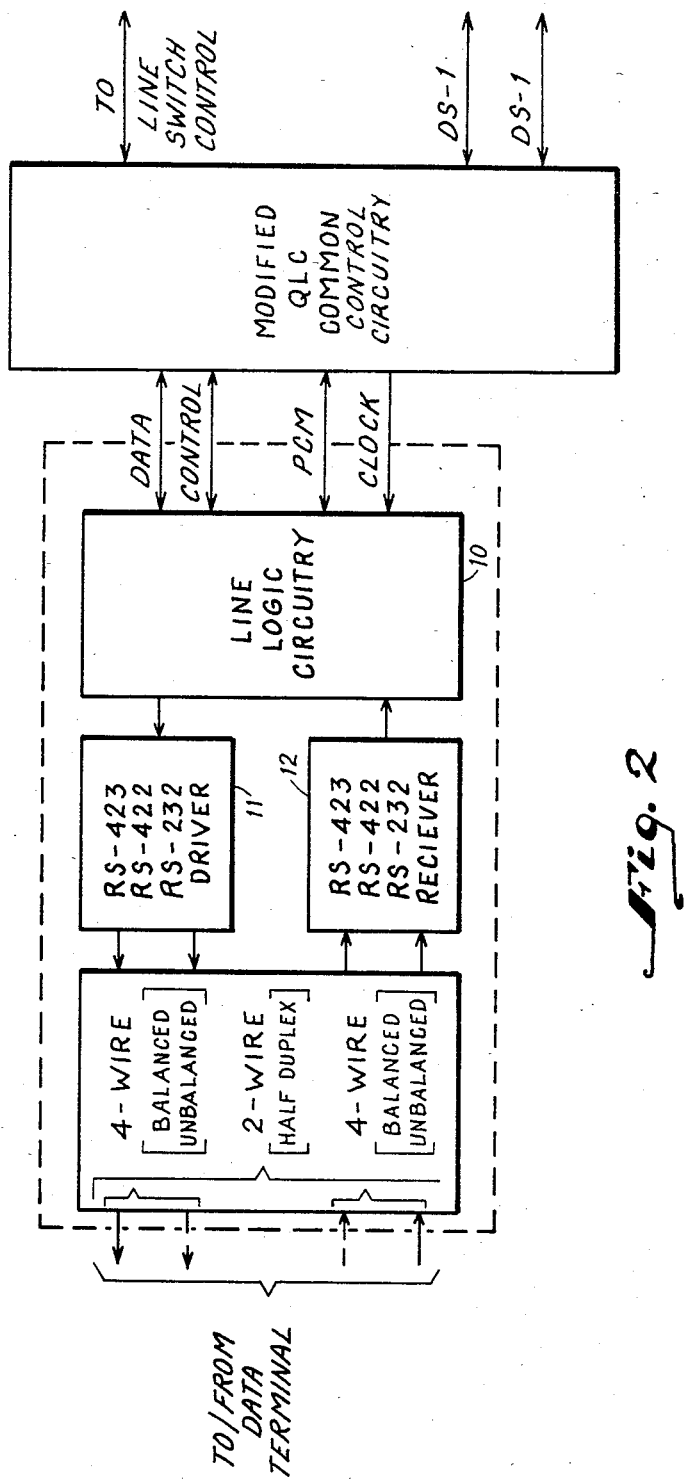
FIG. 2 is a block diagram of the data line card printed board assembly of FIG. 1.

FIG. 2 is a simplified block diagram of a DLC-1. Each DLC-1 contains circuitry which may interface either two DTEs that utilize asynchronous input/output signals without control or one DTE that utilizes synchronous input/output signals with separate control leads.

The purpose of the DLC-1 is to provide interface between DTEs and the ITT 1210 switching system. A DTE may be most types of digital data terminals including various computers which conform to the electrical interface requirements. To enable the DLC-1 to operate with the various DTEs, it will be equipped with hardware options and an on-board microprocessor that may be programmed for the particular application. The microprocessor is contained in the line logic circuitry 10. The DLC-1 will provide the ITT 1210 system with the hardware necessary to allow circuit switched data capability. The DLC-1 will be able to be used in any line card slot within the line switch frame. The DLC-1 will provide the hardware interface between most RS-422/423 compatible terminals or computers and the ITT 1210 system. The data is switched through the ITT 1210 matrix on an 8-bit channel at a 64 Kbs (kilobits per second) rate. However, because an internal signalling bit is embedded in the 8-bit channel, the maximum obtainable data rate is 56 Kbs with a 7-bit effective channel.

The hardware interface between RS-422/423 is provided the drivers 11 and receiver 12 which operate with 4-wire balanced or 2-wire half duplex archetecture.

The DLC-1 is capable of operating in synchronous, asynchronous or synchronous polled modes. To interface with the various DTEs, the DLC-1 shall be equipped with options for selecting operation modes. The electrical interface options will be selected by hardware strapping. The data communications mode and data rates will be programmable by application dependent software via the on-board microprocessor.

When programmed for asynchronous operation with the DTE, the DLC-1 shall be capable of interfacing with up to two 2-wire or two 4-wire DTEs. Data characters may be eitner 5, 6, 7 or 8 bits, which may include an odd, even, or no parity bit. Each character shall be proceeded by a start bit and followed by 1, 1½ or 2-stop bit(s).

When no characters are being sent, the line from the DTE will be at the mark state. The start bit is represented by the transition to the space state for one bit. The space state shall be the opposite of the mark state. The first valid data bit immediately follows the start bit. The stop bit or bits shall immediately follow the last data character bit or parity bit (if enabled) and shall be represented by the line being in the mark state for at least one bit.

In the asynchronous mode, the DLC-1 will have the capability of being programmed to support the following bit rates: 75 BPS (bits per second), 150 BPS, 300 BPS, 600 BPS, 1.2 Kbs, 2.4 Kbs, 4.8 Kbs, 9.6 Kbs and 19.2 Kbs.

When programmed for synchronous operation, the DLC-1 can only interface one DTE. The data leads normally used to interface the second DTE are required for transmit and receive clocks between the DTE and the DLC-1.

Synchronous communication between the DLC-1 and the DTE may be on a character-by-character basis. Character shall be eight data bits, which may include a parity bit. Each synchronous transmission may be proceeded by either one or two sync characters.

When no characters are being sent, the DLC-1shall be programmed for either the line to be in a continuous mark state, or for transmission of continuous synchronization characters to/from the DTE.

The DLC-1 shall be programmed to furnish either the master clock or to receive the master clock from the switching terminal, except when operating at the 56 Kbs rate, in which case the clock must be furnished by the DLC-1.

In the synchronous mode, the DLC-1 may be programmed to support the following bit rates: 2.4 Kbs, 4.8 Kbs, 9.6 Kbs, 19.2 Kbs, 38.4 Kbs, and 56 Kbs.

The DLC-1 shall be capable of working with polled DTEs. The DLC-1 shall poll these terminals during idle for new seizure indication. The DLC-1 will not support polled multi-drop terminals.

The DLC-1 hardware is compatible with the following data communications protocols. The applications software is responsible for providing any required potocol support and conversion to the internal link format.

Character sync oriented by using either the bisynch or ANSI X3.28 techniques. When bit pattern oriented the following techniques can be employed: SDLC, HDLC, ANSI X3.66 and CCITT X.25.

The throughput of the DLC-1 is highly dependent on application determined factors, such as DTE protocol, data rates and data burst characterisitcs. While the PCM data link has a throughput capacity of 56 Kbs, the data processing required for pototcol conversion will in most cases significantly reduce the actual DLC-1 throughput. Since the throughput of the DTE may exceed the DLC-1 throughput, data flow control between the DTE and DLC-1 must be implemented to prevent the loss of data.

The DLC-1 will be capable of being programmed to operate in either a 2-wire half duplex or a 4-wire full duplex mode toward the DTE. When operating in the 2-wire half duplex mode, the receive and transmit data leads must be connected together at the MDF (Main Data Frame).

The DLC-1 line interface toward the DTE will conform to the requirements of the Electronics Industries Association standards RS-422-A (FED-STD-1020), or RS-423A (FED-STD-1030), respectively. Interface capability with the Electronics Industries Association RS-232-C circuits is provided in accordance with the Electronics Industries Association Industrial Electronics Bulletin No. 12. The DLC-1 will only support transmit and receive data pairs under normal operation. However, it is possible to implement a subset of the control leads by sacrificing one of the DTE interfaces.

The DLC-1 to System 1210 electrical interface will be identical to a standard line card to System 1210 interface. Data received from the DTE will be transmitted to the System 1210 utilizing a standard 1.544 MHz (megahertz) PCM channel. The channel assignment is received from the line switch controller. The least significant bit of the 8-bit PCM channel will always contain the switch hook status information of the DLC-1.

On power-up the microprocessor will perform the following self-checks and tests to verify program and data memory and as much of the hardware as practical. Microprocessor integrity, ROM Checksum, RAM integrity and DTE USART (Universal Synchronous, Asynchronous Receiver and Transmitter) and baud rate verification via loopback. The DLC-1 is equipped to have a downloadable program memory mode of operation in which the microprocessor shall provide a seizure toward the ITT 1210 System and place itself in a download state.

The microprocessor on the DLC-1 is capable of having its operating software downloaded via the data path from the DTE or ITT 1210 system. This download feature enables each DLC-1 to be programmed for its specific application upon power-up or restart. The download software shall initially reside in a customer administrated data base within a designated DTE called the "Control DTE".

A software download is initiated by the DCL-1 at power-up. After successful completion of its power-up diagnostics, the DLC-1 will present a seizure toward the ITT 1210 system; i.e., set the switch hook detector bit of the appropriate data lane to the logic state "1". When the ITT 1210 system detects the seizure it will scan the line classmarks to determined whether to automatically route the DLC-1 line to the control DTE using the hot line classmark feature, or set the line to the terminate state. If the line is set to the terminate state, the microprocessor shall communicate with the DTE to receive its download. If the load is successful, the DLC-1 shall remove its seizure indication on the switch hook detector bit. The ITT 1210 system will then break the connection or order the line switch controller to place the DLC-1 to the idle state and the DLC-1 will become operational.

If the DLC-1 goes out of service due to loss of power, watchdog timeout, etc., the above download procedure is automatically activated by the DLC-1 upon successful completion of restart diagnostics.

Data and control information is transferred tnrough the 56 Kbs PCM link between DLC-1s in an HDLC frame format. Each DLC-1 is responsible for converting the protocol of its attached DTE to the internal format and protocol supported over the PCM link. This insures that any DTE can communicate with any other DTE to the extent that its own protocol can be converted to the internal format by the DLC-1 and its associated applications program.

Figure 3:
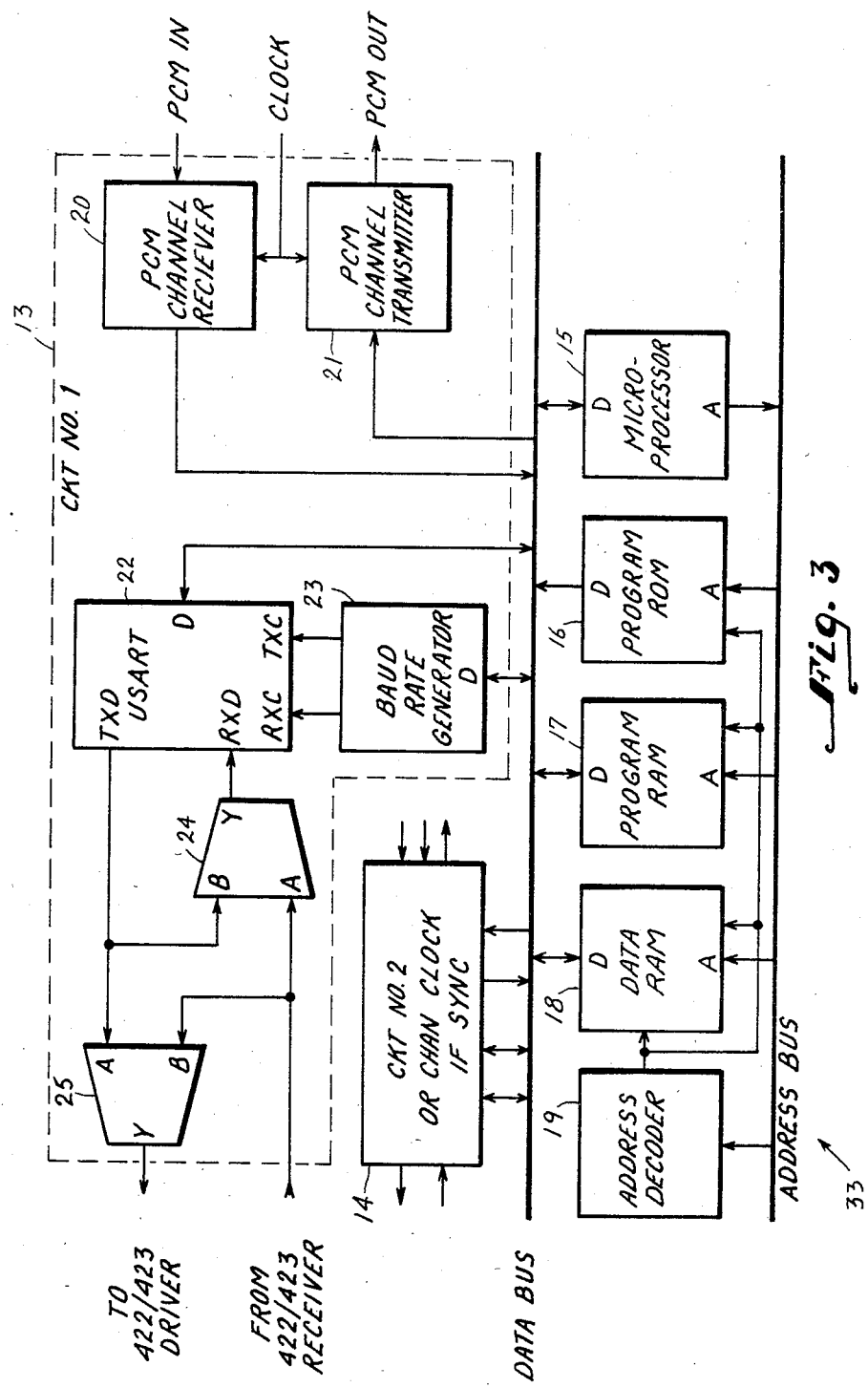
FIG. 3 is a block diagram of the line logic circuitry of FIG. 2.

Referring to FIG. 3, the line logic circuit 10 is shown in greater detail and includes two circuits 13 and 14 each of which is controlled by a common computer arrangement including microprocessor 15, program ROM 16, program RAM 17, data RAM 18 and address decoder 19.

Each of the circuits 13 and 14 include a PCM channel receiver 20 and PCM channel transmitter 21 connected to line switch frame 1. Receiver 20 and receiver 21 receive the clock from line switch frame 1. Circuits 13 and 14 further include USART 22 and its associated baud rate generator 23. USART 24 is coupled to selectors 24 and 25 to control the flow of data between the driver 11 and receiver 12 of FIG. 2.

Figure 4A:
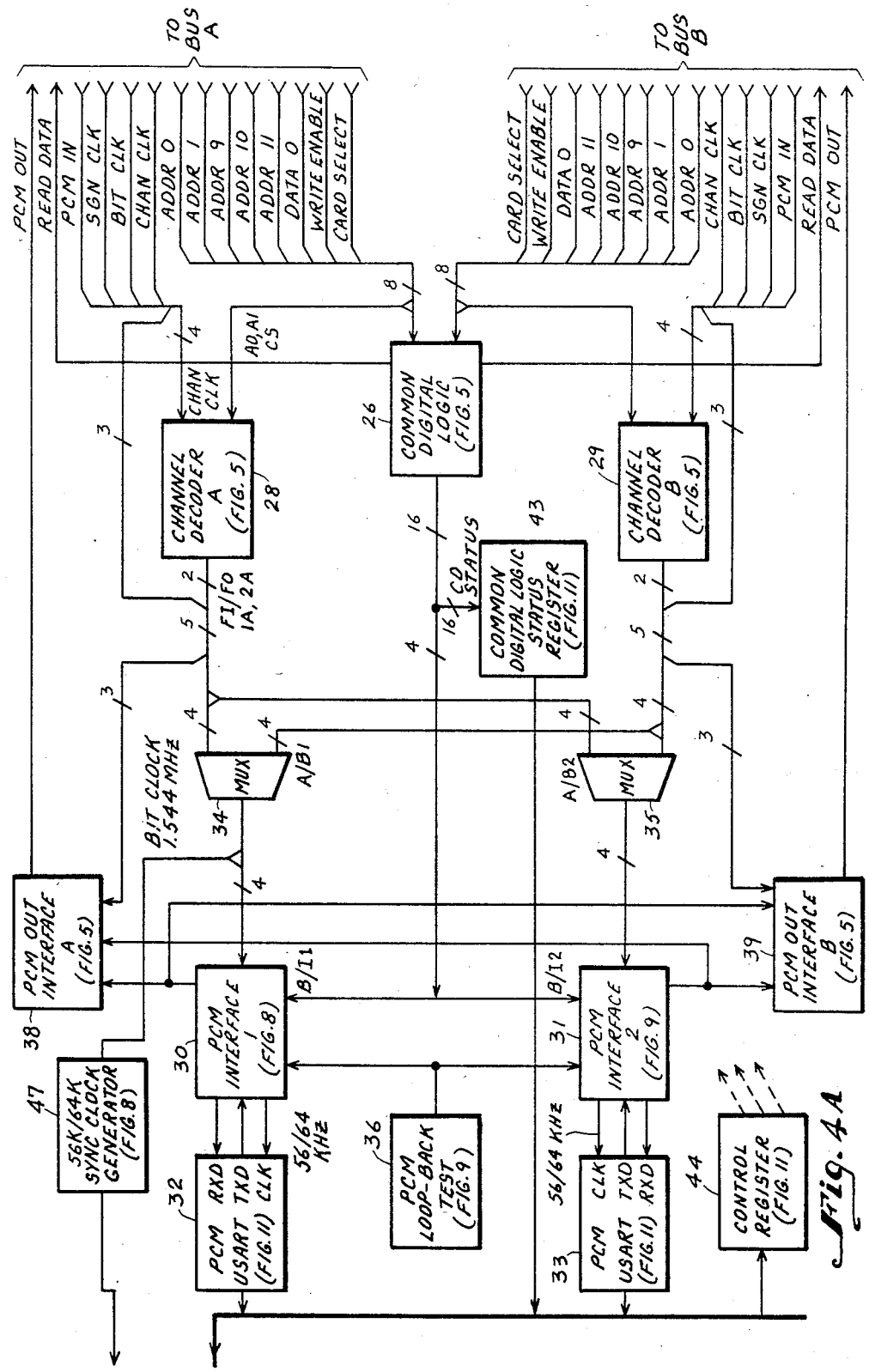
Figures 5, 5B:
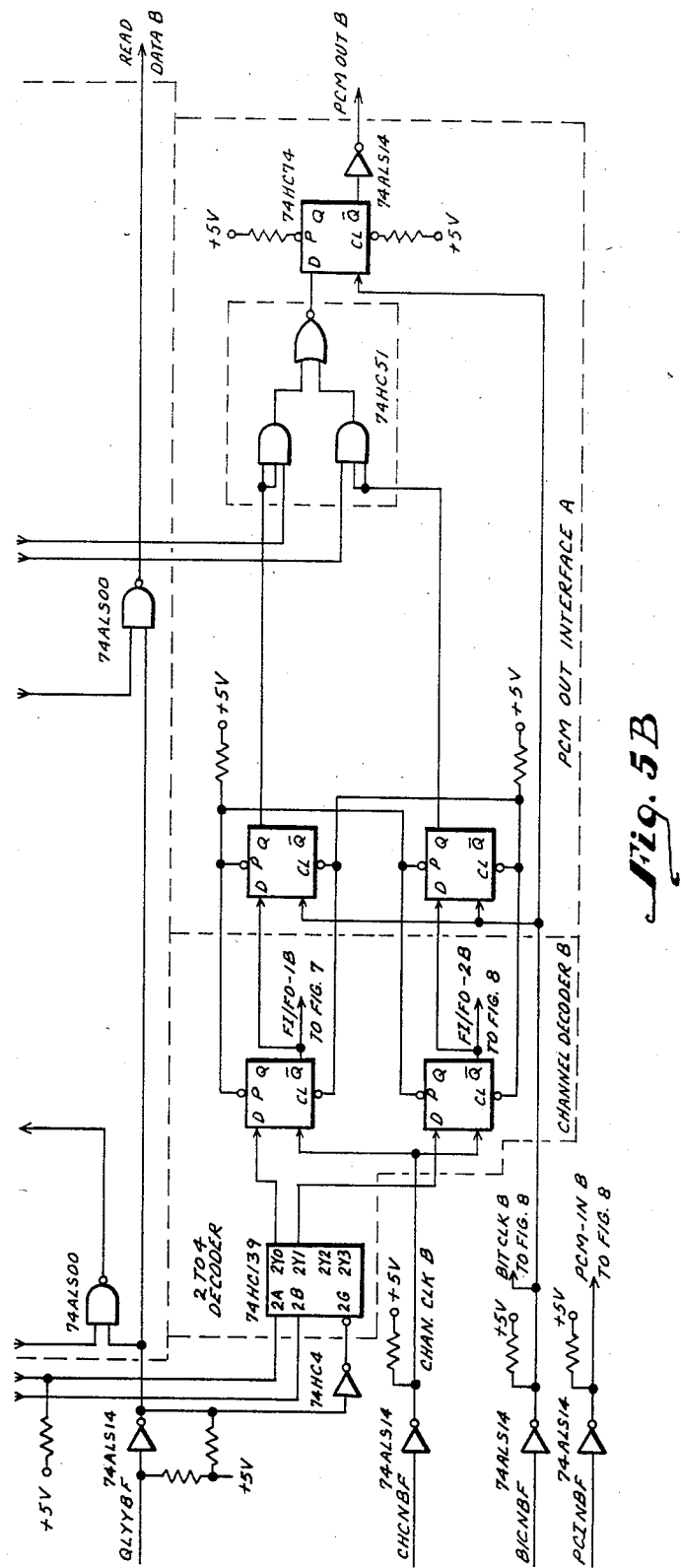
FIGS. 5 and 5A, when organized as shown in FIG. 5 is a detailed block diagram of channel decoders A and B, PCM out interfaces A and B and the common digital logic of FIG. 4A.
Figure 5A:
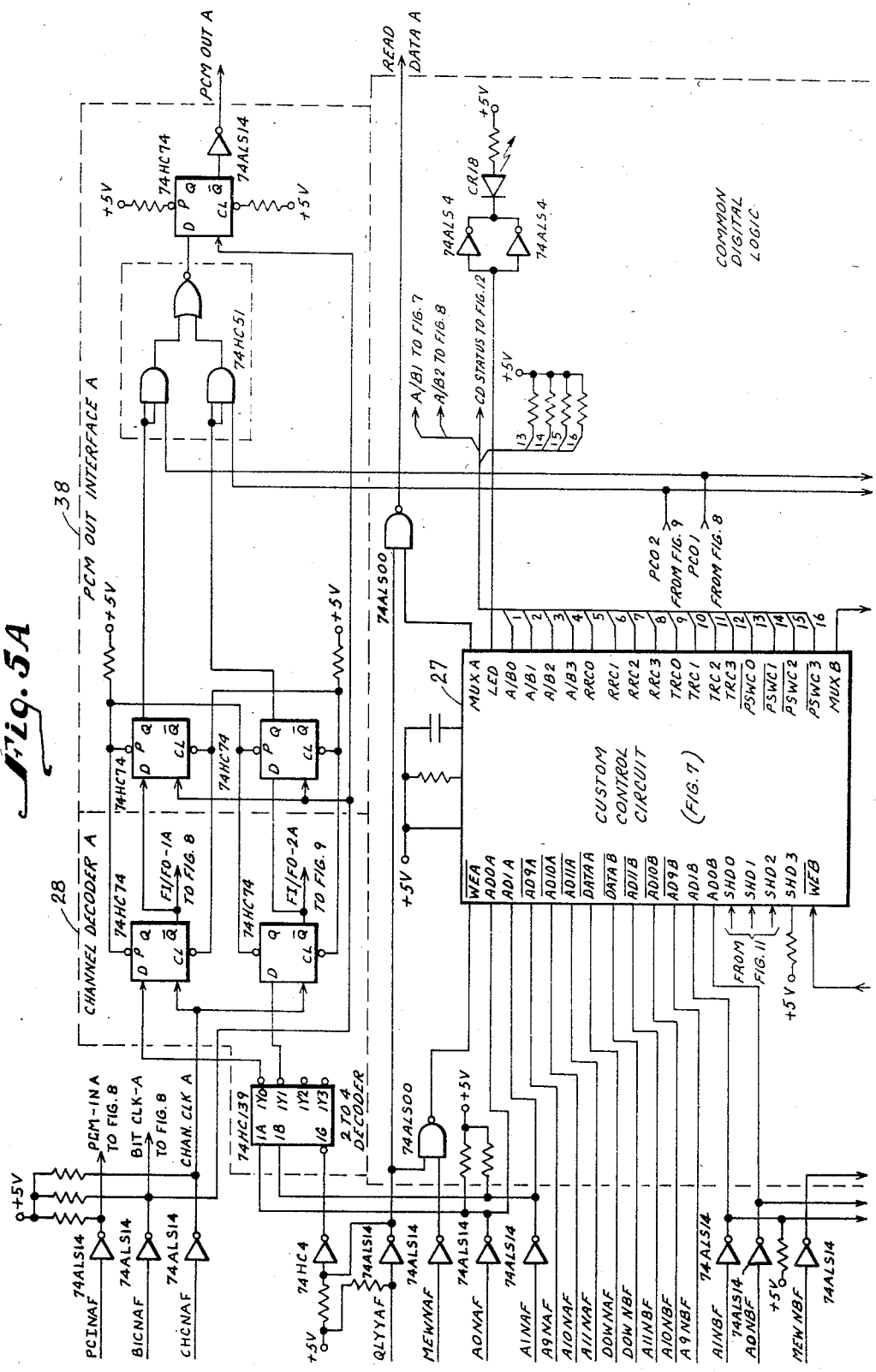
Figure 7:
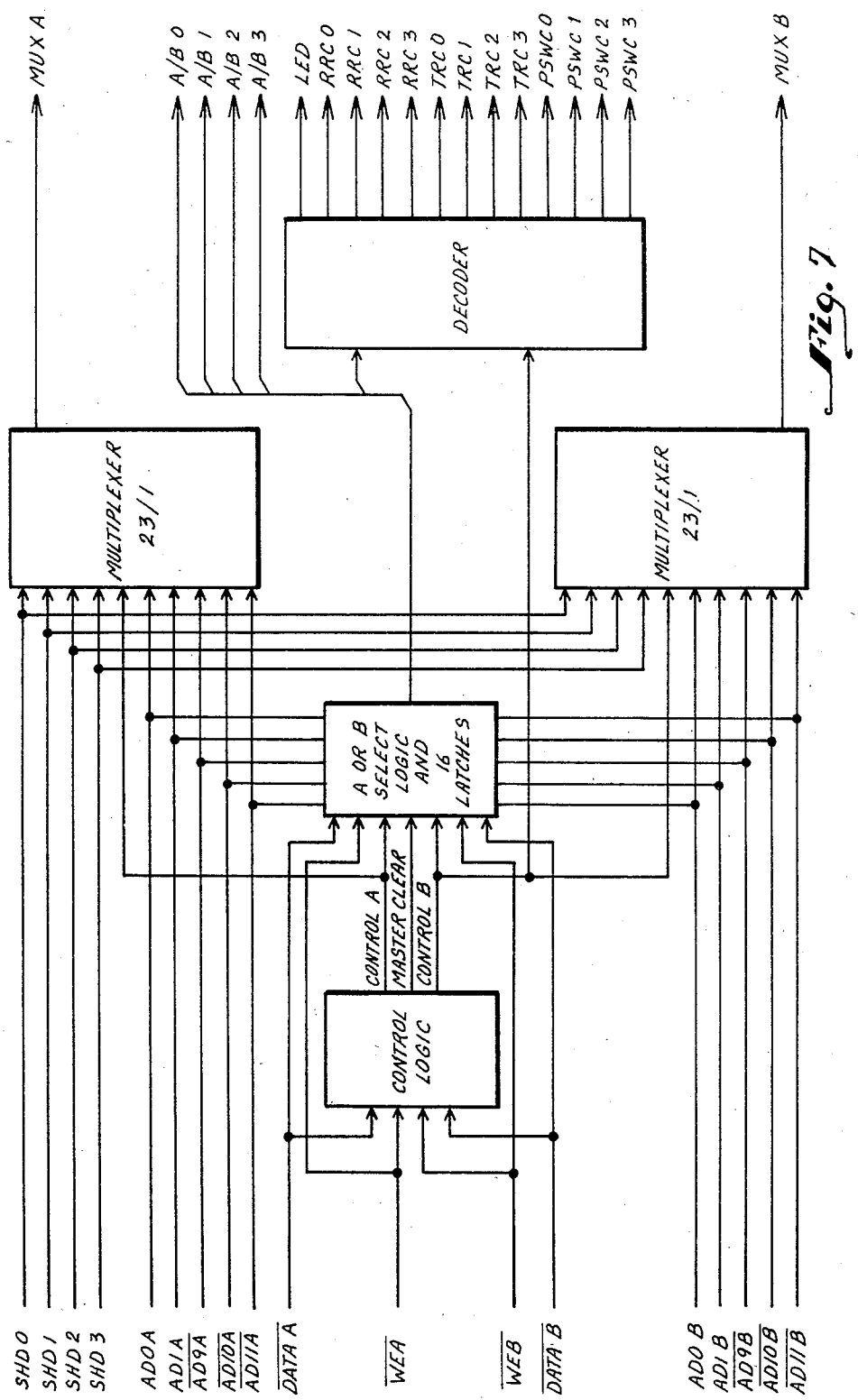
FIG. 7 is a block diagram of the common control circuit of FIG. 5.

Referring to FIGS. 4A and 4B when organized as shown in FIG. 4, the DLC-1 will be described in greater detail. The description will make reference to various detailed block diagrams identified in the various general blocks of FIGS. 4A and 4B. Common digital logic 26 shown in FIGS. 5 and 5A is a standard line switch controller interface for a line card. The custom control circuit 27 shown in FIG. 7 provides for all four lines, even though the DLC-1 has only two lines. The other two lines are referred to as "phantom lines". The control bits for the two "phantom lines" are used for certain control functions. Table I shows how the various control bits are addressed. The actual output signals are decoded from those given in Table I. Table II shows how the signals are decoded. Note that states 0 and 3 have the same outputs as do states 2 and 4.

TABLE I

| Function | | WRITE | | | | | | | READ | | | | | | |
|---|---|---|---|---|---|---|---|---|---|---|---|---|---|---|---|
| | | WE | Data | 4 | 3 | 2 | 1 | 0 | CT | WS | Data | 4 | 3 | 2 | 1 | 0 | CT |
| 0 | B/I-0 | 1 | D | 0 | 0 | 0 | 0 | 0 | 1 | 0 | — | 0 | 0 | 0 | 0 | 0 | X |
| 1 | B/I-1 | 1 | D | 0 | 0 | 0 | 0 | 1 | 1 | 0 | — | 0 | 0 | 0 | 0 | 1 | X |
| 2 | B/I-2 | 1 | D | 0 | 0 | 0 | 1 | 0 | 1 | 0 | — | 0 | 0 | 0 | 1 | 0 | X |
| 3 | B/I-3 | 1 | D | 0 | 0 | 0 | 1 | 1 | 1 | 0 | — | 0 | 0 | 0 | 1 | 1 | X |
| 4 | RR-0 | 1 | D | 0 | 0 | 1 | 0 | 0 | 1 | 0 | — | 0 | 0 | 1 | 0 | 0 | X |
| 5 | RR-1 | 1 | D | 0 | 0 | 1 | 0 | 1 | 1 | 0 | — | 0 | 0 | 1 | 0 | 1 | X |
| 6 | RR-2 | 1 | D | 0 | 0 | 1 | 1 | 0 | 1 | 0 | — | 0 | 0 | 1 | 1 | 0 | X |
| 7 | RR-3 | 1 | D | 0 | 0 | 1 | 1 | 1 | 1 | 0 | — | 0 | 0 | 1 | 1 | 1 | X |
| 8 | TR-0 | 1 | D | 0 | 1 | 0 | 0 | 0 | 1 | 0 | — | 0 | 1 | 0 | 0 | 0 | X |
| 9 | TR-1 | 1 | D | 0 | 1 | 0 | 0 | 1 | 1 | 0 | — | 0 | 1 | 0 | 0 | 1 | X |
| 10 | TR-2 | 1 | D | 0 | 1 | 0 | 1 | 0 | 1 | 0 | — | 0 | 1 | 0 | 1 | 0 | X |
| 11 | TR-3 | 1 | D | 0 | 1 | 0 | 1 | 1 | 1 | 0 | — | 0 | 1 | 0 | 1 | 1 | X |
| 12 | A/B-0 | 1 | D | 0 | 1 | 1 | 0 | 0 | 1 | 0 | — | 0 | 1 | 1 | 0 | 0 | X |
| 13 | A/B-1 | 1 | D | 0 | 1 | 1 | 0 | 1 | 1 | 0 | — | 0 | 1 | 1 | 0 | 1 | X |
| 14 | A/B-2 | 1 | D | 0 | 1 | 1 | 1 | 0 | 1 | 0 | — | 0 | 1 | 1 | 1 | 0 | X |
| 15 | A/B-3 | 1 | D | 0 | 1 | 1 | 1 | 1 | 1 | 0 | — | 0 | 1 | 1 | 1 | 1 | X |
| 16 | SHD-0 | — | — | — | — | — | — | — | — | 0 | — | 1 | 0 | 0 | 0 | 0 | X |
| 17 | SHD-1 | — | — | — | — | — | — | — | — | 0 | — | 1 | 0 | 0 | 0 | 1 | X |
| 18 | SHD-2 | — | — | — | — | — | — | — | — | 0 | — | 1 | 0 | 0 | 1 | 0 | X |
| 19 | SHD-3 | — | — | — | — | — | — | — | — | 0 | — | 1 | 0 | 0 | 1 | 1 | X |
| 20 | EXIS 0 | — | — | — | — | — | — | — | — | 0 | — | 1 | 0 | 1 | 0 | 0 | X |
| 21 | EXIS 1 | — | — | — | — | — | — | — | — | 0 | — | 1 | 0 | 1 | 0 | 1 | X |
| 22 | CONT | 1 | D | 1 | 0 | 1 | 1 | 0 | X | 0 | — | 1 | 0 | 1 | 1 | 0 | X |
| 23 | MASTER CLEAR | 1 | 0 | 1 | 0 | 1 | 1 | 1 | X | — | — | — | — | — | — | — | — |
| 24 | These | — | — | 1 | 1 | 0 | 0 | 0 | — | — | — | 1 | 1 | 0 | 0 | 0 | — |
| 25 | Ad- | — | — | 1 | 1 | 0 | 0 | 1 | — | — | — | 1 | 1 | 0 | 0 | 1 | — |
| 26 | dresses | — | — | 1 | 1 | 0 | 1 | 0 | — | — | — | 1 | 1 | 0 | 1 | 0 | — |
| 27 | Re- | — | — | 1 | 1 | 0 | 1 | 1 | — | — | — | 1 | 1 | 0 | 1 | 1 | — |
| 28 | served | — | — | 1 | 1 | 1 | 0 | 0 | — | — | — | 1 | 1 | 1 | 0 | 0 | — |
| 29 | | — | — | 1 | 1 | 1 | 0 | 1 | — | — | — | 1 | 1 | 1 | 0 | 1 | — |
| 30 | | — | — | 1 | 1 | 1 | 1 | 0 | — | — | — | 1 | 1 | 1 | 1 | 0 | — |
| 31 | | — | — | 1 | 1 | 1 | 1 | 1 | — | — | — | 1 | 1 | 1 | 1 | 1 | — |

NOTES:
X = Don't Care
— = Doesn't Apply
D = Logic 1 or logic 0
CT = Contention

TABLE II

| | STATES | | | OUTPUT FUNCTION | | |
|---|---|---|---|---|---|---|
| | B/I | RR | TR | PWR | RRCTRL | TRCTRL | LED |
| 0 | 0 | 0 | 0 | 0 | 0 | 0 | 0 |
| 1 | 0 | 0 | 1 | 0 | 0 | 1 | 1 |
| 2 | 0 | 1 | 0 | 1 | 0 | 0 | 1 |
| 3 | 0 | 1 | 1 | 0 | 0 | 0 | 0 |
| 4 | 1 | 0 | 0 | 1 | 0 | 0 | 1 |
| 5 | 1 | 0 | 1 | 1 | 0 | 1 | 1 |
| 6 | 1 | 1 | 0 | 1 | 1 | 0 | 1 |
| 7 | 1 | 1 | 1 | 1 | 1 | 1 | 1 |

LED OUTPUT IS LOW ONLY WHEN ALL FOUR BI(0-3), RR(0-3) AND TR (0-3) BITS ARE IN ONE OF THE TWO GIVEN STATES

Channel decoders 28 and 29 select active channels by the card select A0 and A1 signals. A 1-out-of-4 decoder is used to indicate the channel selected. The channel selects are strobed into a 4-bit register by the channel clock (CHC) signal. Note Table III:

TABLE III

| CS | A1 | A0 | |
|---|---|---|---|
| 0 | X | X | No Line Selected |
| 1 | 0 | 0 | Channel Assigned to Line 1 |
| 1 | 0 | 1 | Channel Assigned to Line 2 |
| 1 | 1 | 0 | Not Used |
| 1 | 1 | 1 | Not Used |

X = DON'T CARE

Figure 6:
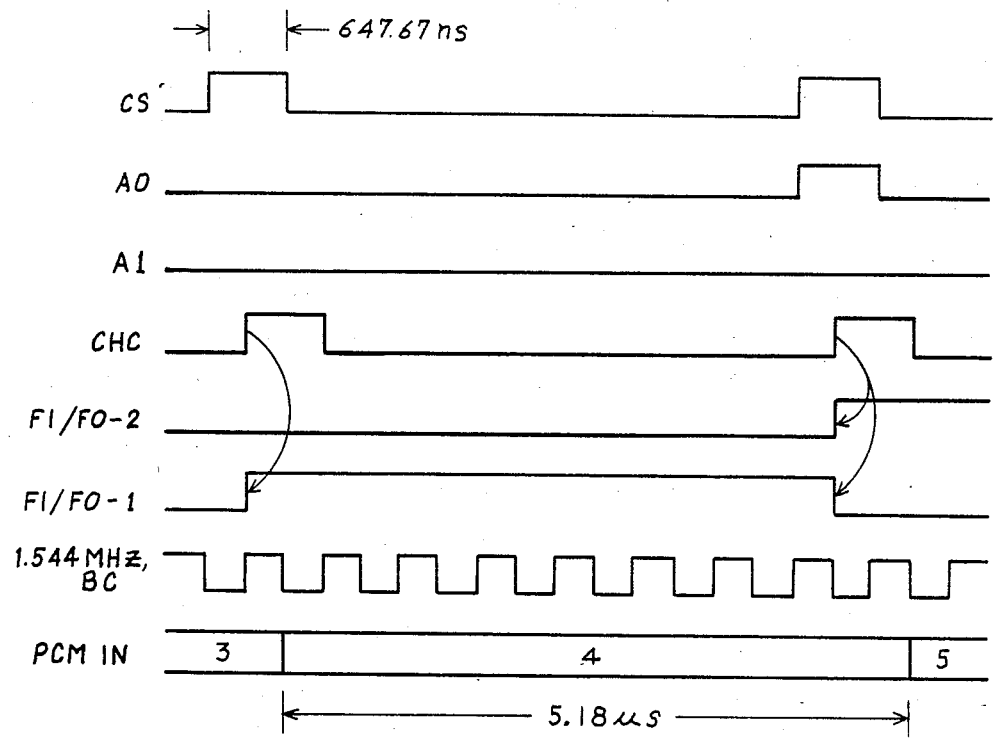
FIG. 6 is a set of waveforms useful in explaining operation of the data line card of the present invention.

Each assigned channel is bracketed by a pair of channel clocks. The outputs of the registers are designated FI/FO, one set for the A side and the other for the B side. Any FI/FO will be one channel period in length, which is 5.18 microseconds for channels 1 through 23 and 5.83 microseconds for channel 0. The FI/FO signal is used to indicate to the selected port the time period in which data is to be received from the PCM IN data bus and inserted on the PCM OUT data bus. Typical timing for te channel select function is shown in FIG. 6.

Figure 8:
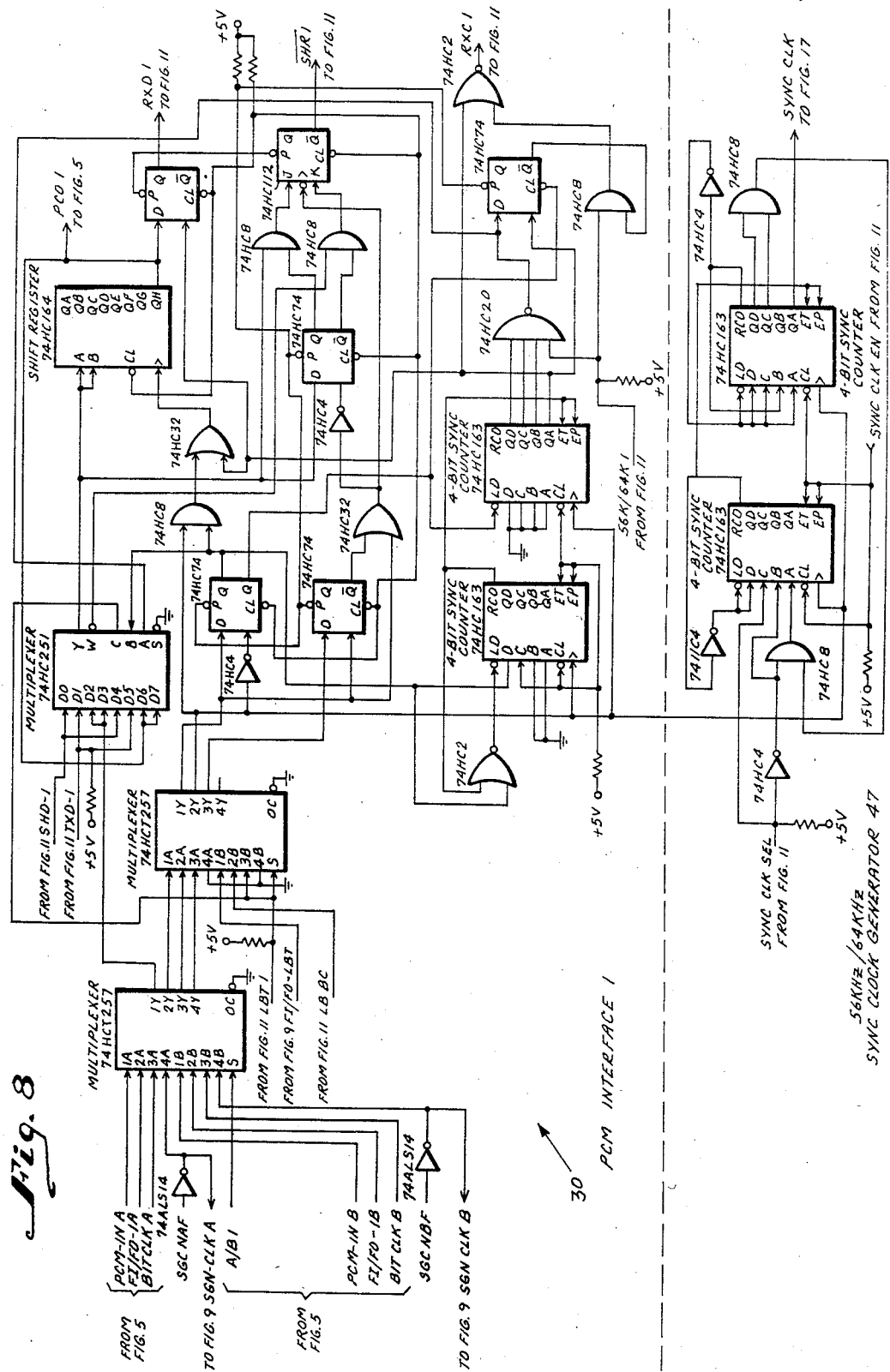
FIG. 8 is a detailed block diagram of PCM interface 1 and the sync clock generator of FIG. 4A.
Figure 9:
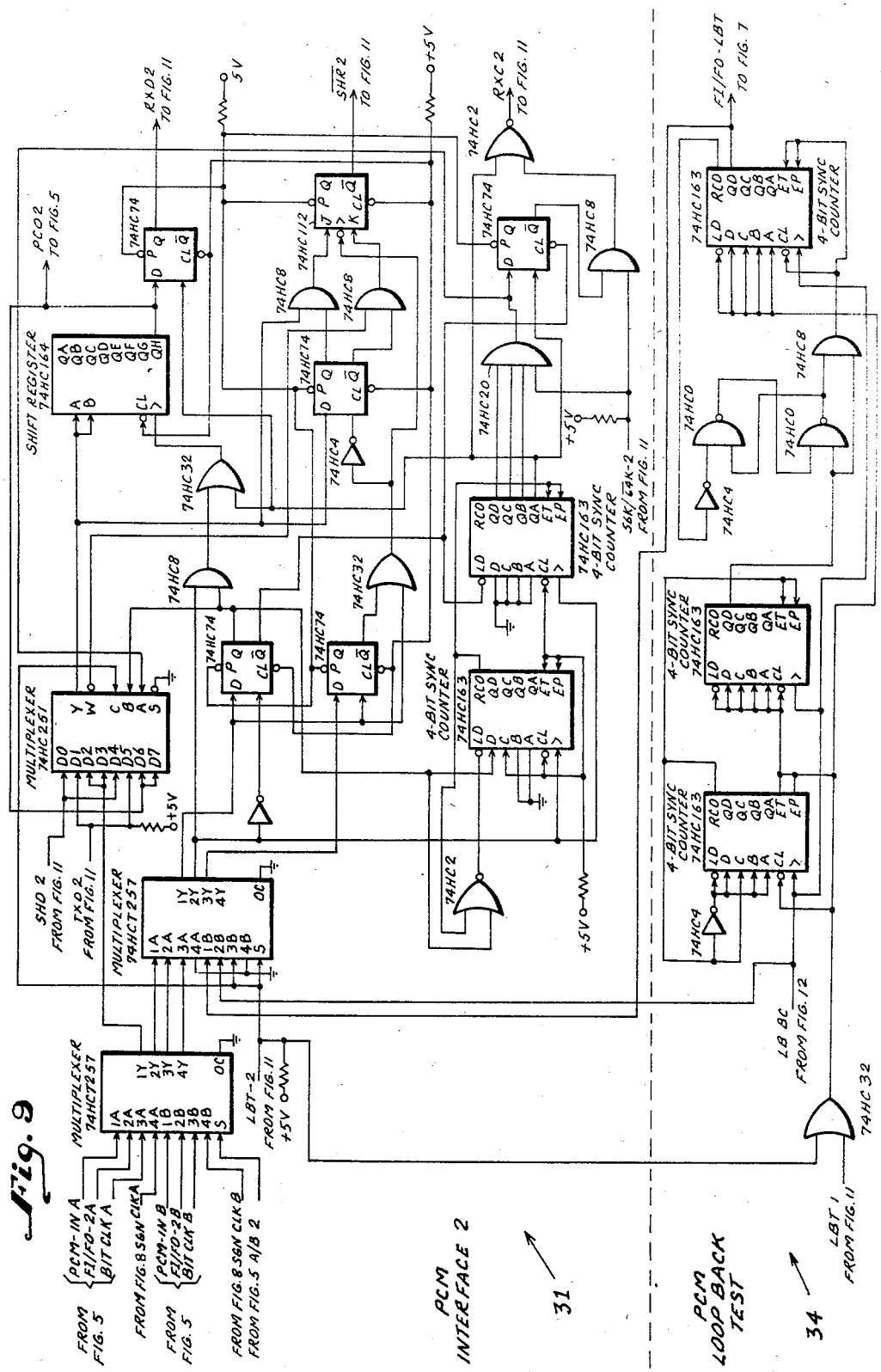
FIG. 9 is a detailed block diagram of PCM interface 2 and the PCM loop-back test circuit of FIG. 4A.
Figure 11:
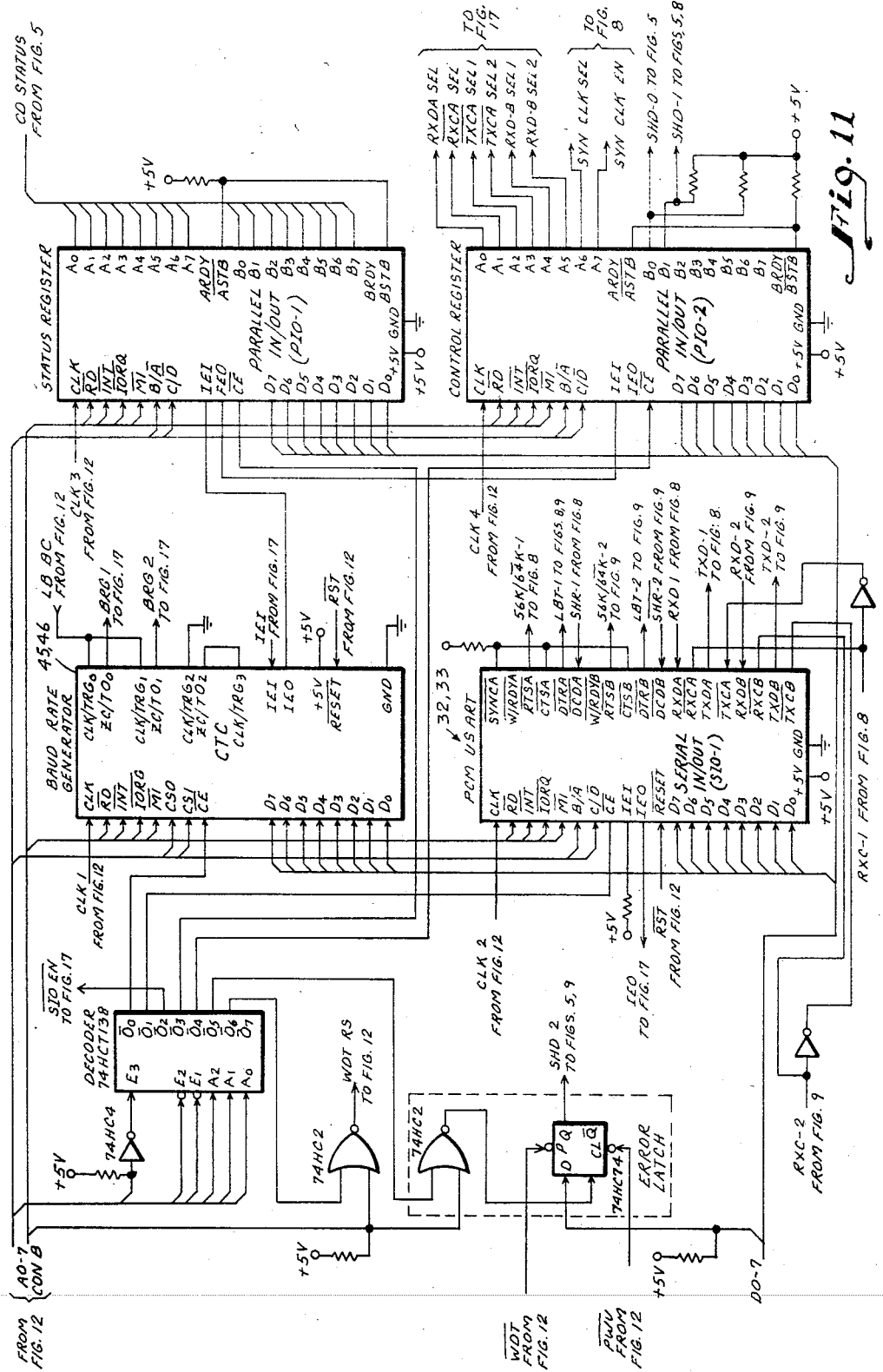
FIG. 11 is a detailed block diagram of a baud rate generator, the PCM universal synchronous, asynchronous receiver transmitter, the status register and the control register of FIG. 4A.

PCM interfaces 30 and 31 shown in FIGS. 8 and 9 extract data from the incoming channel and present the data to their associated PCM USART 32 and 33, respectively, shown in FIG. 11. Interface circuits 30 and 31 also take data from the PCM USART 32 and 33 and insert the data into the outgoing channel.

Channels may be assigned on either the A side or the B side of the line switch. Multiplexers 34 and 35 controlled by the common digital A/B bit selects which side the circuit uses.

Two channel clocks bracket an assigned channel. These clocks are used to generate a signal which gates tne channel contents into an eight-bit shift register. As this data word is shifted in, the previous contents are shifted out to the outgoing PCM channel.

Figure 10:
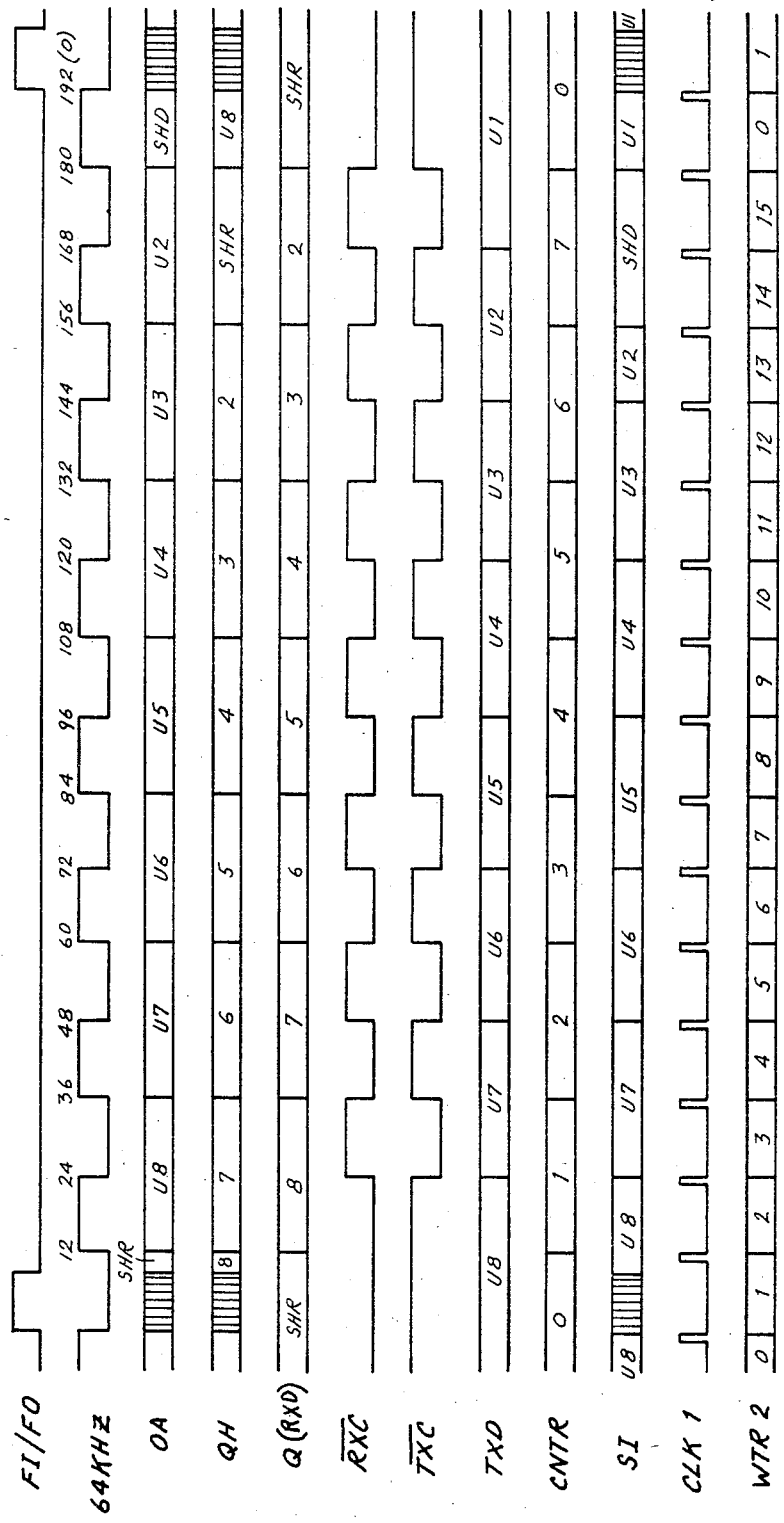
FIG. 10 is a set of curves illustrating the timing of the PCM interfaces of FIGS. 8 and 9.

After this PCM channel time slot is over, the newly arrived data word is shifted out at 64 KHz (kilohertz) to the receive input of a USART 32 or 33. The USART is clocked such that it accepts seven bits. These least significant bit is not accepted. As this occurs, seven bits of the USART transmit data are clocked into the shift register at 64 KHz. The least significant bit that is clocked in is the switch-hook state. FIG. 10 shows the timing involved in the PCM interfaces 30 and 31.

Every sixth frame the incoming least significant bit is a switch-hook status. This bit is captured by a latch. If the bit changes value for two consecutive ratings, the output of another latch is changed. The PCM USART will detect a switch-hook state using its data carrier detect (DCD) input.

There is an operating mode of 64 KHz instead of 56 KHz, under software control. In the 64 KHz mode there would be no supervision bit. The USART 32 or 33 will send and receive 8 bits during each channel time in this mode.

The PCM interface 30 and 31 includes a multiplexer to substitute test signals for system signals. The circuit can be tested even when back plane signals are not present, only power and ground are required.

Each of the PCM interface circuits 30 and 31 connect to a USART 32 and 33, respectively, that reside in SIO-1 (FIG. 11). The SIO is capable of performing a wide range of data communication requirements. The operating mode is selected by the control section of th DLC-1.

USART 32 and 33 always operates in the X1 clock mode, with a clock rate normally 56 KHz (selectable for 64 KHz). Other operating modes, such as asynchronous or synchronous operation, are program selectable.

Some of the input/output (I/O) signals of the USART 32 or 33 are used to control the PCM interface 30 or 31. Signal RTS is used to select either 56 KHz or 64 KHz operation. Signal DTR is used to place the PCM interface in a self-test, loop-backed mode of operation. Signal DCD is used to monitor the switch-hook received signal.

The PCM USART 32 and 33 occupies I/O addresses 4 through 7.

The loop-back test circuit 36 allows the controller to be able to output a message to the PCM circuit, have it looped back and received. During self test the microprocessor could check that this function works properly.

In order to do loop-back testing, a clock (1.288 MHz), derived from the 4.9152 MHz crystal oscillator 37 (Note FIG. 12) is substituted for the 1.544 MHz bit clock. A signal is generated to replace FI/FO, which is eight test clock periods wide, and repeats once every 192 clock periods. When loop-back testing is not being done, this circuit is disabled.

PCM output interface circuits 38 and 39 shown in greater detail in FIG. 5, delays by one clock period the FI/FO signal, used by the PCM interface 30 and 31. This resulting signal is used to gate the output PCM from the 8-bit shift register in the PCM interface. The gated PCM is clocked by a flip-flop and buffered to the output.

Figure 12:
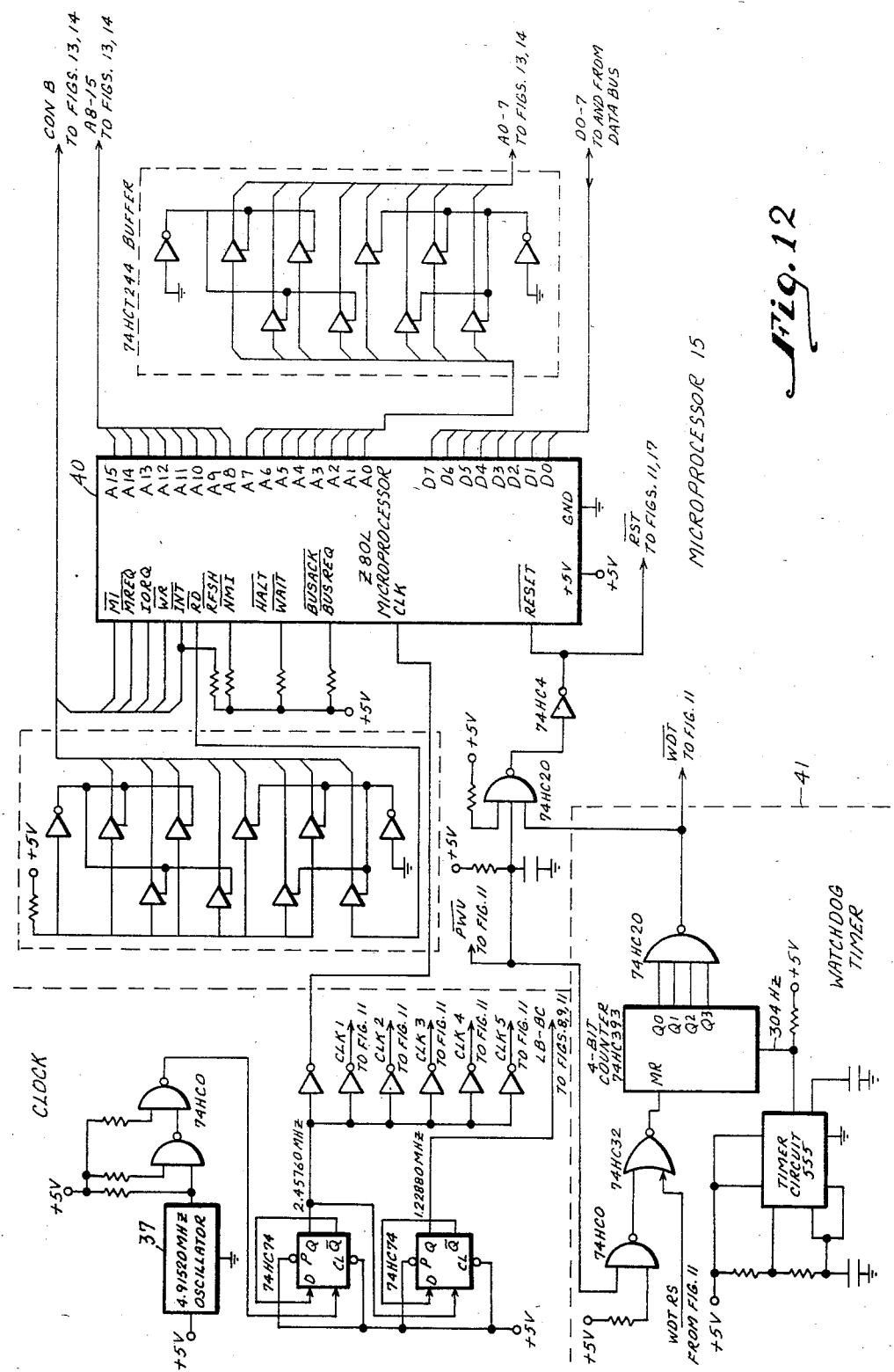
FIG. 12 is detailed block diagram of the microprocessor and watch dog timer of FIG. 4B.
Figure 13:
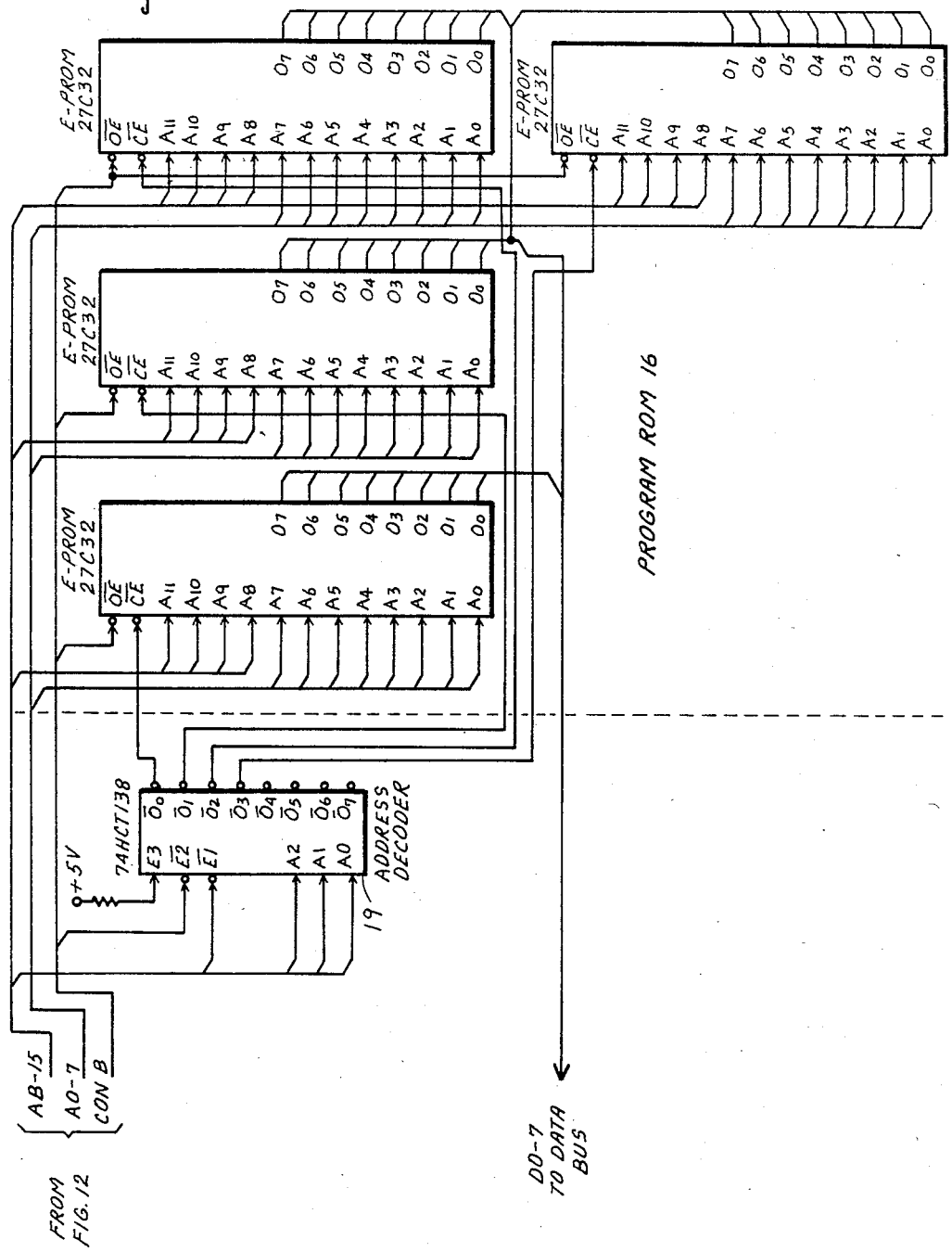
FIG. 13 is a detailed block diagram of the address decoder and program ROM of FIG. 4B.
Figure 14:
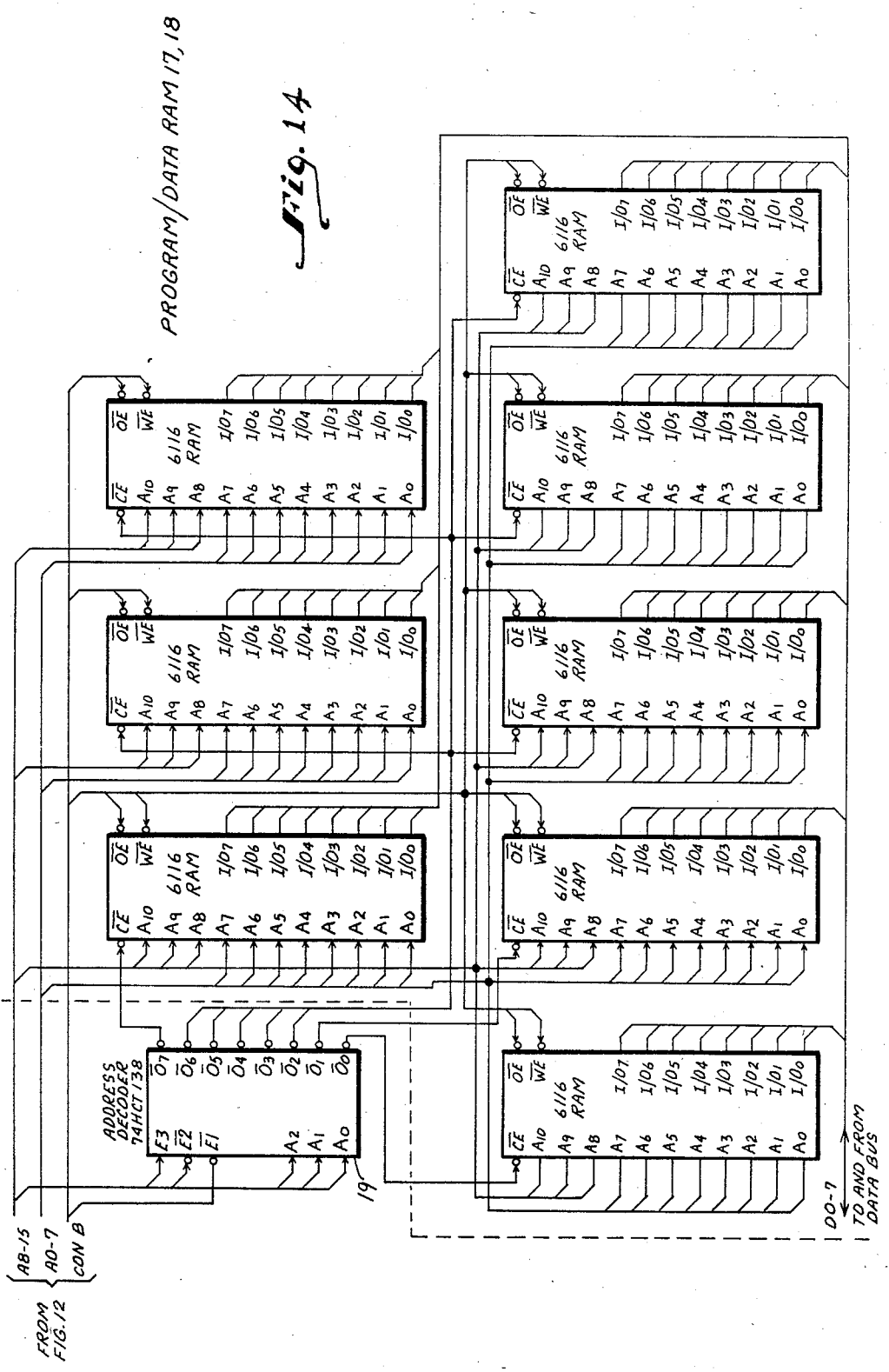
FIG. 14 is a detailed block diagram of the program/data RAM and address decoder of FIG. 4B.
Figure 15:
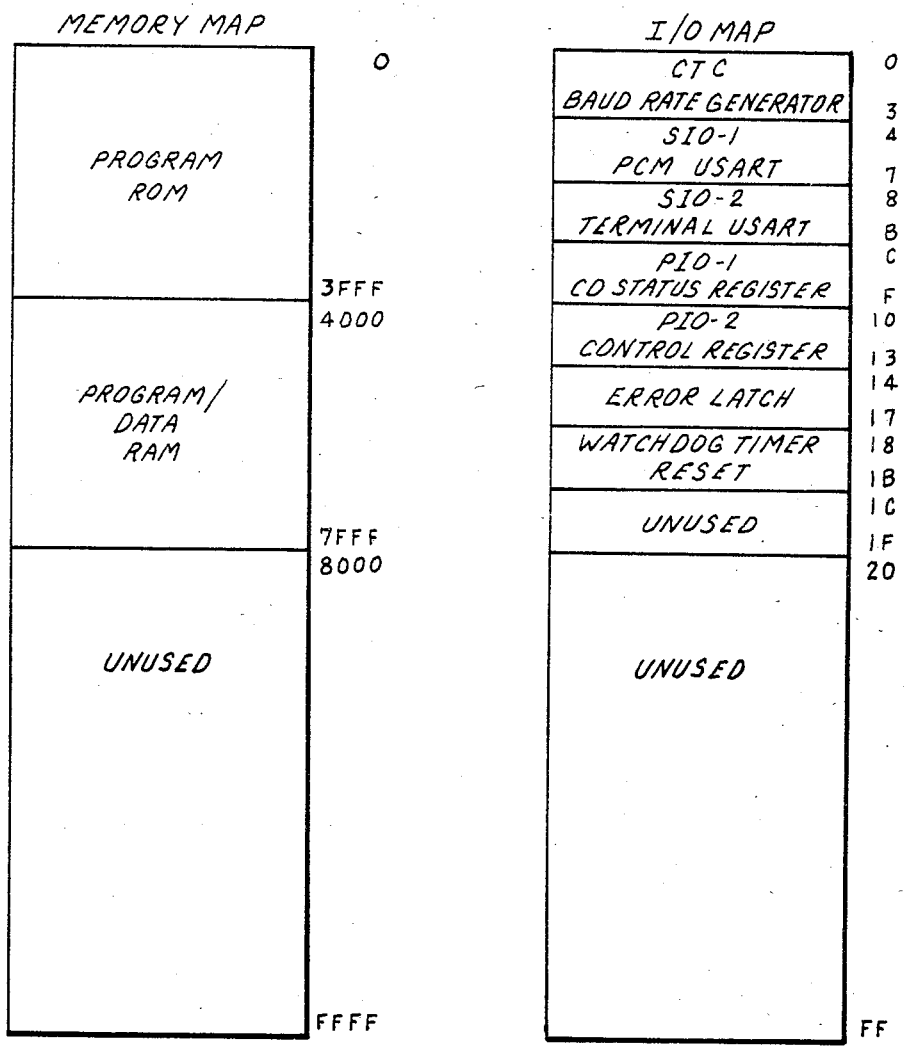
FIG. 15 is a memory map and input/output map of the microprocessor of FIGS. 4B and 12.

As previously mentioned, the DLC-1 is controlled by a microprocessor 15 shown in greater detail in FIG. 12 in which microprocessor Z80L is employed with associated EPROM and RAM 16, 17 and 18 as shown in FIGS. 13 and 14, each with an associated address detector 19. The function of the microprocessor is to perform self-testing, down load software into RAM 17,18 when required, do data transfer between USARTs and data RAM 18 and perform maintenance functions. The microprocessor 40 is driven by a 2.4576 MHz clock, which is derived from 4.9152 MHz crystal oscillator 37. The 2.4576 MHz clock also drives the various peripheral integrated circuits controlled by microprocessor 40. The microprocessor 40 has an 8-bit data bus and a 16-bit address bus. FIG. 15 shows the memory and I/O maps for the control section. Space is provided for 16K of program ROM and 16K of program/data RAM. All 32K do not have to be equipped.

The watch-dog timer 41 (FIG. 12) is used to monitor the control section. The timeout period is nominally equal to 50 milliseconds. If the timer does not receive a reset signal within 50 milliseconds from the previous reset, a timeout will occur. This will force the control section into the initialization state.

The watch-dog timer 41 is reset by the control section by writing I/O addresses 18 through 1B.

Error latch 42 of FIGS. 4B and 11 is used to turn on a red LED when an error is found. It is set whenever there is a watch-dog timeout. The latch 42 may also be set by the control section when it finds a software detectable error. When power is first applied to the DLC-1, latch 42 is maintained in a reset state.

The output of latch 42 also goes to SHD3 of the common digital logic 26. This provides a procedure by which the system can detect DLC-1 errors by detecting off-hook on a phantom line.

The latch occupies I/O addresses 14–17.

The common digital logic status register 43 of FIGS. 4A and 11 allows the microprocessor to monitor the CD status bits for all four lines. The bits from the CD are latched in order that the data to the microprocessor will not change while being read.

Each of the four lines controlled by the CD has four bits of control, for a total of 16 bits. These bits are interface to the controller through PIO-1 (FIG. 11). Both ports of PIO-1 are programmed as control ports with all bits specified as inputs. Interrupts may be generated by changes in these bits. Bit masking is provided by he PIO-1 for each input.

PIO-1 occupies I/O addresses OC through OF, and is always programmed for control mode (Mode 3) operation with all signals assigned as inputs. Table IV below shows the signal designations.

TABLE IV

| SIGNAL | |
|---|---|
| A0 | A/B4 |
| A1 | PSWC4 |
| A2 | RRC4 |
| A3 | TRC4 |
| A4 | A/B3 |
| A5 | PSWC3 |
| A6 | RRC3 |
| A7 | TRC3 |
| B0 | A/B1 |
| B1 | PSWC1 |
| B2 | RRC1 |
| B3 | TRC1 |
| B4 | A/B2 |
| B5 | PSWC2 |
| B6 | RRC2 |
| B7 | TRC2 |

Control register 44 shown in FIGS. 4A and 11 is implemented by PIO-2. It provides sixteen possible, latched outputs for controlling the operation of DLC-1. The control section uses the control Register 44 to place the DLC-1 into different operating modes.

The control register 44 occupies I/O addresses 10–13. It is always programmed in the control mode (mode 3) with all signals assigned as outputs. The Table V below shows the signal designations.

TABLE V

| SIGNAL | | |
|---|---|---|
| A0 | RXDA SEL | Select date source for RXDA, Out 1, and CTSA |
| A1 | RXCL SEL | Select clock source for RXCA |
| A2 | TXCA SEL 1 | Select clock source for TXCA |

TABLE V-continued

| SIGNAL | | |
|---|---|---|
| A3 | TXCA SEL 2 | |
| A4 | RXDB SEL 1 | Select date source for RXDB and OUT 2 |
| A5 | RXDB SEL 2 | |
| A6 | SYNCLK SEL | 56KHZ/64KHZ select |
| A7 | SYNCLK EN | 56KHZ/64KHZ enable |
| B0 | SHD 1 | Switch hook for line 1 |
| B1 | SHD 2 | Switch hook for line 2 |

Baud rate generators 45 and 46 are provided for each terminal interface 47 and 48' and are shown in FIG. 11. Baud rate generators 45 are programmed by the microprocessor 15. From an input provided by the 4.9152 MHz oscillator 37 (FIG. 12), all standard frequencies may be generated. Note Table VI below.

TABLE VI

| SYNC DATA, CLOCK RATE | ASYNC | |
|---|---|---|
| | DATA RATE | CLOCK RATE |
| 1.2K | 75 | 1.2K |
| 2.4K | 150 | 2.4K |
| 4.8K | 300 | 4.8K |
| 9.2K | 600 | 9.6K |
| 19.6K | 1.2K | 19.2K |
| 38.4K | 2.4K | 38.4K |
| | | 76.8K |
| | 9.6K | 153.6K |
| | 19.2K | 307.2K |
| | 38.4K | 614.4K |

To obtain the desired data rate requires the proper selection of the signals CTC and the SIO (USART). The following Tables VII–VIII show what selections are necessary. The signal CTC output for BRG1 is divided by 2 by a flip flop before the signal reaches the SIO. This is necessary to guaranty a 50% duty cycle needed for synchronous terminal operation.

The signal CTC occupies I/O addresses 00–03.

TABLE VII

| BRG 1. (ZCT00) | | | | | | |
|---|---|---|---|---|---|---|
| ASYNC Baud Rate | SIO Clock Rate | Clock Mode | CTC REF | CTC Mode | CTC Output | Rate DIV |
| 38.4K | 614.4K | X16 | 1.2288M | C | 1.2288M | 1 |
| 19.2K | 307.2K | X16 | 1.2288M | C | 614.4K | 2 |
| 9.6K | 153.6K | X16 | 1.2288M | C | 307.2K | 4 |
| 4.8K | 76.8K | X16 | 1.2288M | C | 153.6K | 8 |
| 2.4K | 38.4K | X16 | 1.2288M | C | 76.8K | 16 |
| 1.2K | 19.2K | X16 | 1.2288M | C | 38.4K | 32 |
| 600 | 9.6k | X16 | 1.2288M | C | 19.2K | 64 |
| 300 | 4.8K | X16 | 1.2288M | C | 9.6K | 128 |
| 150 | 2.4K | X16 | 1.2288M | C | 4.8K | 256 |
| 75 | 2.4K | X32 | 1.2288M | C | 4.8K | 256 |

TABLE VIII

| SYNC BAUD Rate | Clock Rate | Clock Mode | CTC REF | CTC Mode | CTC Output | CTC DIV |
|---|---|---|---|---|---|---|
| 38.4K | 38.4K | X1 | 1.2288M | C | 76.8K | 16 |
| 19.2K | 19.2K | X1 | 1.2288M | C | 38.4K | 32 |
| 9.6K | 9.6K | X1 | 1.2288M | C | 19.2K | 64 |
| 4.8K | 4.8K | X1 | 1.2288M | C | 9.6K | 128 |
| 2.4K | 2.4K | X1 | 1.2288M | C | 4.8K | 256 |
| 1.2K | 1.2K | X1 | 2.4576M | TX16 | 2.4K | 64 |

TABLE IX

| BRG 2. (ZCT01) | | | | | | |
|---|---|---|---|---|---|---|
| ASYN BAUD Rate | Clock Rate | SIO Clock Mode | CTC REF | CTC Mode | CTC Output | CTC DIV |
| 38.4k | 614.4k | X16 | 1.2288M | C | 614.4K | 2 |
| 19.2k | 307.2k | X16 | 1.2288M | C | 307.2K | 4 |
| 9.6k | 153.6k | X16 | 1.2288M | C | 153.6K | 8 |
| 4.8k | 76.8k | X16 | 1.2288M | C | 76.8K | 16 |
| 2.4k | 38.4k | X16 | 1.2288M | C | 38.4K | 32 |
| 1.2k | 19.2k | X16 | 1.2288M | C | 19.2K | 64 |
| 600 | 9.6k | X16 | 1.2288M | C | 9.6K | 128 |
| 300 | 4.8k | X16 | 1.2288M | C | 4.8K | 256 |
| 150 | 4.8k | X32 | 1.2288M | C | 4.8K | 256 |
| 75 | 4.8 | X64 | 1.2288M | C | 4.8K | 256 |

Sync clock generator 47 shown in FIG. 4A and FIG. 8 provides a clock generator for the bit clock used by PCM interface 30 and 31. It may be disabled when not needed. A selection is provided to choose between 56 KHz output or a 64 KHz output.

The bit clock has a rate of 1.544 MHz, but one pulse is missing in every 193. This gives an effective rare of 1.536 MHz. It is desirable to have a 50% duty cycle output clock, but this is not possible. The clocks that are generated are as close to 50% duty cycle as can easily be done.

The 56 KHz clock is generated by dividing each 125 microsecond period into 14 phases. Each of the ten consecutive phases is 14 clock periods wide. The remaining four phases are 13 clock periods wide. Due to the bit clock, any of the 14 phases may be an additional clock period wide.

The 64 KHz clock is generated by dividing the bit clock by 24. This divides each 125 microsecond period into 16 phases, each of which is 12 clock periods wide. Any of the 16 phases may be an additional clock period wide due to the missing pulse in the bit clock.

Figure 16:
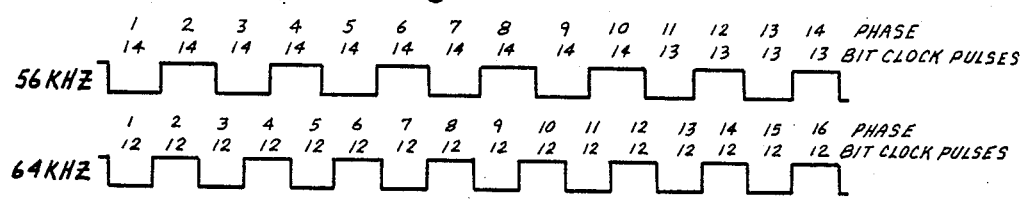
FIG. 16 is a set of curves illustrating the 56 KHz/64 KHz clock generator.

FIG. 16 shows the timing of the clock generator 47.

The CTC or mode rate generator of FIG. 11 contains four timers, two of which are used for baud rate generators. The remaining two may be used by the control section as general purpose timers. The output of the third timer is wired to the input of the fourth timer. The two timers may be used independently with both in the timer mode, or used together with the fourth timer in the counter mode. An interrupt may be generated when a timer reaches its final value.

Figure 17:
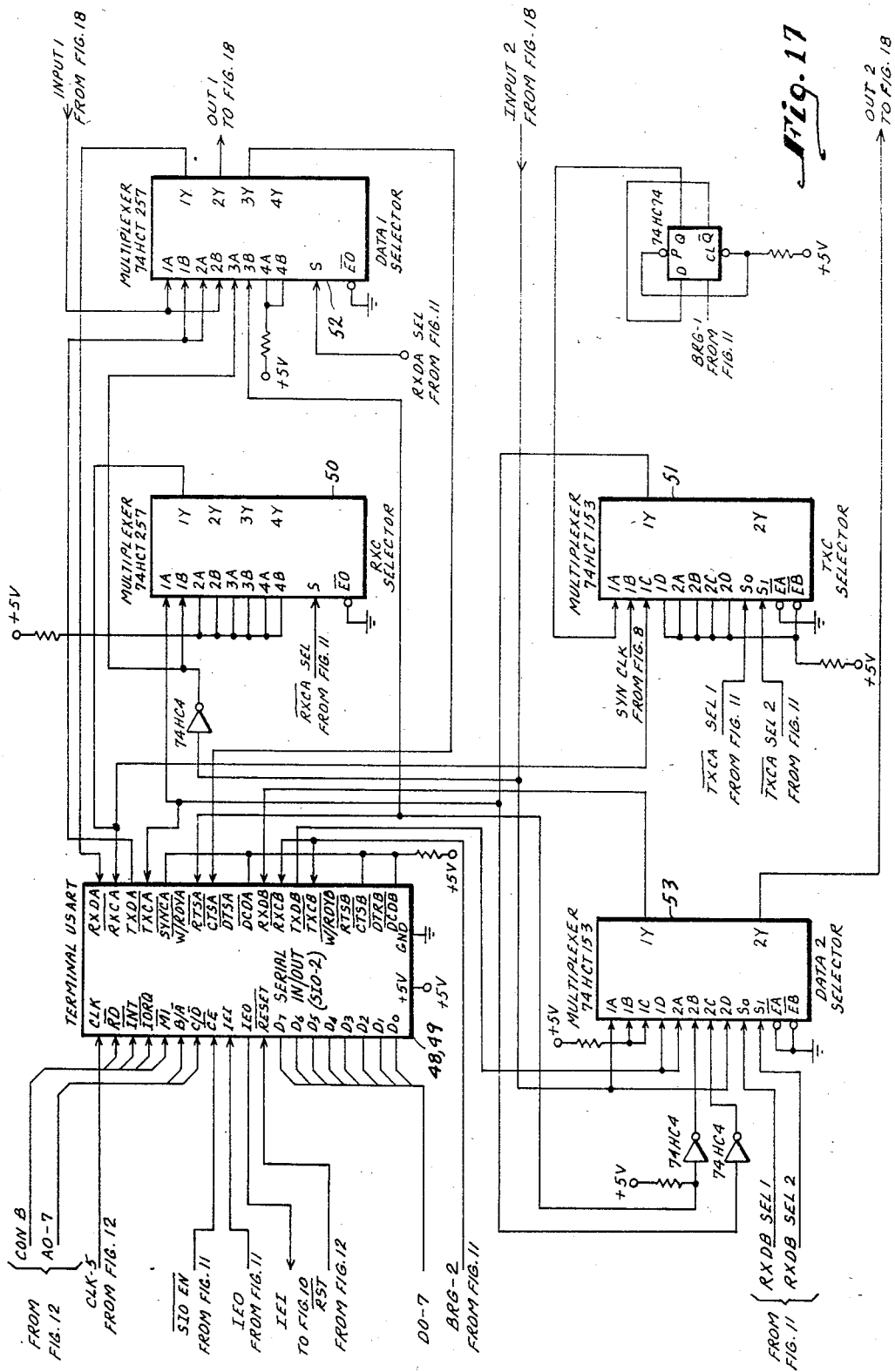
FIG. 17 is a detailed block diagram of the terminal universal synchronous, asynchronous receiver and transmitter with its associated selector circuits of FIG. 4B.

The terminal USART's 48 and 49 shown in FIGS. 4B and FIG. 17 is provided by SIO-2 as shown in FIG. 17. SIO-2 provides two USART's to interface the two data terminals (DTE's). There are multiplexers 50–53 coupled to SIO-2 to select various operating modes as shown hereinbelow in TABLE X.

TABLE X

| RXCA SEL | RXCA | |
|---|---|---|
| 0 | TXCA | |
| 1 | INPUT 2 | |

| TXCA SEL 2 | TXCA SEL 1 | TXCA |
|---|---|---|
| 0 | 0 | BRG 1 |
| 0 | 1 | SYN CLK (56KHZ or 64KHZ) |
| 1 | 0 | RXCA |
| 1 | 1 | 1 (not used) |

| RXDB SEL 1 | RXCB SEL 2 | RXDB | OUT 2 |
|---|---|---|---|
| 0 | 0 | I2 | TXDB |
| 0 | 1 | 1 | RTSA |
| 1 | 0 | 1 | TXCA |
| 1 | 1 | TXDB | I2 (LOOP-BACK) |

TABLE X-continued

| RXDA SEL | RXDA | CTSA | OUT 1 |
| --- | --- | --- | --- |
| 0 | IINPUT 1 | INPUT 2 | TXDA |
| 1 | TXDA | RTSA | INPUT 1 (LOOP-BACK) |

The latch occupies each of the ten consecutive phases and is fourteen clock periods wide. The remaining four phases are thirteen clock periods wide. Due to the bit clock, any of the fourteen phases may be an additonal clock period wide.

The 64 KHz clock is generated by dividing the bit clock by 24. This divides each 25 microsecond period into sixteen phases, each of which is 12 clock periods wide. Any of the 16 phases may be an additional clock period wide due to the missing pulse in the bit clock.

FIG. 16 shows tne timing of the clock generator 47.

Tne CTTC or mood rate generator of FIG. 11 contains four timers, two of which are used for bode rate generators. The remaining two may be used by the control section as general purpose timers. The output of the third timer is wired to the input of the fourth times.

The two timers may be used independently with both in the timer mode, or used together with the fourth timer in the counter mode. An interrupt may be generated when a timer reaches its final value.

The terminal USARTs 48 and 49 shown in FIGS. 4B and FIG. 17 is provided by SIO-2 as shown in FIG. 17. SIO-2 provides two USARTs to interface the two data terminals (DTEs). There are multiplexers 50-53 coupled to SIO-2 to select various operating modes as shown hereinbelow in Table X.

The terminal USART 48 and 49 occupies I/O addresses 8 through 0B.

Figure 18:
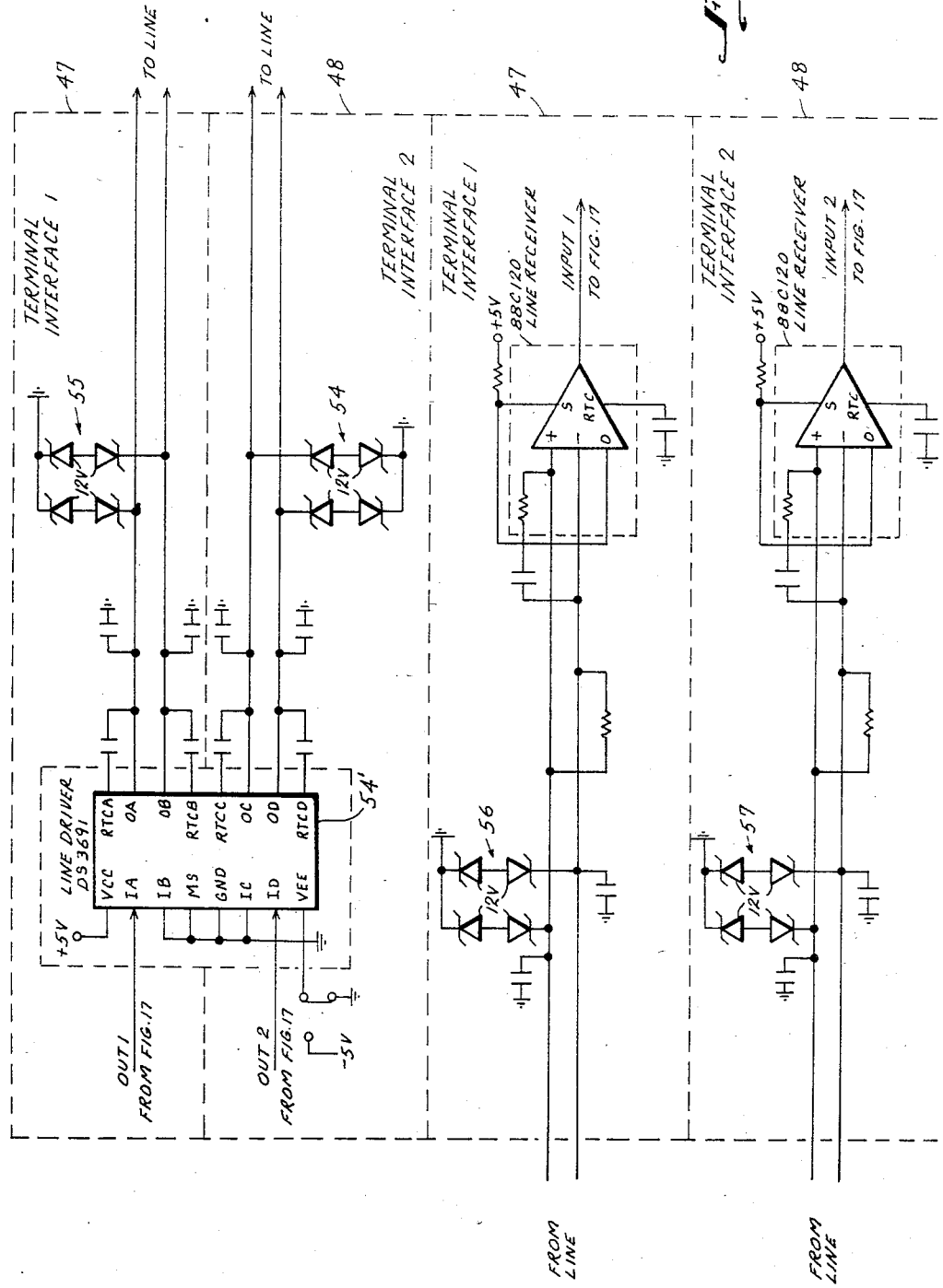
FIG. 18 is a detailed block diagram of the terminal interfaces 1 and 2 of FIG. 4B.

Terminal interfaces 47 and 48' are implemented using RS-422/RS-423 compatible line drivers and receivers as shown in FIG. 18. The line driver 54 has an optioned input which determines whether the output range is from ground to +5 volts or from −5 volts to +5 volts. For RS-422 operation this pin is gounded; for RS-423 operation the pin is connected to −5 volts.

The receiver has an input voltage range of plus and minus 15 volts which also connects to RS-232 devices. Receiver respose control is provided to allow the addition of a capacitor to reduce noise. A line termination resistor may be connected when needed by adding a capacitor.

In tne RS-423 mode either a positive or negative "mark" signal may be selected. The other wire of the driver pair may be grounded to provide a reference for the terminal's receiver. The terminal may supply a ground reference for the DLC-1's receiver, or a local ground may be selected.

The DLC-1 has four output pairs available to interface DTEs. The following Table XI indicates how these pairs are used in different modes of operation.

TABLE XI

| MODE | PAIR | | | |
| --- | --- | --- | --- | --- |
|  | 0 | 1 | 2 | 3 |
| 2 ASYNC TERMS | XMIT 1 | REC 1 | XMIT 2 | REC 2 |
| 1 ASYNC TERM WITH CONTROL | XMIT | REC | DTR/RTS | DSR/CTS |
| 1 ASYNC TERM | XMIT | REC | XCLK | RCLIC |

Secondary protection is provided by zener diodes 54-57 to prevent accidental damage to the driver and receiver integrated circuits.

While we have described above the principles of our invention in connection with specific apparatus, it is to be clearly understood that this description is made only by way of example and not as a limitation to the scope of our invention as set forth in the objects thereof and in the accompanying claims.

We claim:

1. A data line card printed board assembly to provide an interface between a switching system and data terminal equipment operating in a selected one of a synchronous mode, an asynchronous mode and a synchronous polled mode and at a selected one of a plurality of different data rates comprising:

first means coupled to said switching system to provide a first bidirectional communication path between said switching systems and said data line card;

second means coupled to said first means and said data terminal equipment to provide said first bidirectional communication path between a first of said data terminal equipment and said data line card;

computer means disposed on said assembly coupled to said first and second means for bidirectional control of said first and second means to accommodate said selected one of said modes and said selected one of said plurality of different data rates; and a clock generator disposed on said assembly coupled to said first and second means responsive to a clock signal received from said switching system, wherein said first means includes first decoder means coupled to said switching system to indicate a first time period in which data is received from said switching system for said first bidirectional communication path and transmitted to said switching system from said first bidirectional communication path, first synchronous, asynchronous receiver and transmitter means coupled to an internal data bus, and first interface means coupled to said switching system, said first synchronous, asynchronous receiver and transmitter means and said first decoder means under control of said first decoder to present input data from said switching system to said internal data bus and to present output data on said first bidirectional communication path from said internal data bus to said switching system.

2. An assembly according to claim 1, wherein said second means includes second synchronous, asynchronous receiver and transmitter means coupled to said internal data bus in said first bidirectional communication path, and second interface means coupled to said first of said data terminal equipment and said second synchronous, asynchronous receiver and transmitter means to present said input data on said internal data bus in said first bidirectional communication path to said first of said data terminal equipment and to present said output data from said first of said data terminal equipment to said internal data bus.

3. An assembly according to claim 2, wherein said second means further includes first baud rate generator means coupled to said second synchronous, asynchronous receiver and transmitter means to control the flow of data therethrough.

4. An assembly according to claim 3, wherein said computer means includes
   a microprocessor coupled to said internal data bus and an address bus,
   a program read only memory coupled to said internal data bus and said address bus,
   a program random access memory coupled to said internal data bus and said address bus, and
   a data random access memory coupled to said internal data bus and said address bus to provide data rate buffering for said selected one of said plurality of different data rates.

5. An assembly according to claim 4, further including
   third means coupled to said switching system and said computer means to provide a second bidirectional communication path between said switching system and said data line card, said third means being controlled by said computer means; and
   fourth means coupled to said computer means, said third means and said data terminal equipment to provide said second bidirectional communication path between said data terminal equipment and said data line card, said fourth means being contolled by said computer means, said second bidirectional communication path being coupled to said first of said data terminal equipment to transmit and receive clocks between said data line card and said first of said data terminal equipment when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

6. An assembly according to claim 5, further including
   digital logic means coupled in common to said first and third means.

7. An assembly according to claim 6, wherein said third means includes
   second decoder means coupled to said switching system to indicate a second time period in which data is received from said switching system for said second bidirectional communication path and transmitted to said switching system from said second bidirectional communication path,
   third synchronous, asyncnronous receiver and transmitter means coupled to said internal data bus, and
   third interface means coupled to said switching system, said third synchronous, asynchronous receiver and transmitter means and said second decoder means under control of said second decoder means to present input data from said switching system to said internal data bus and to present output data on said second bidirectional communication path from said internal data bus to said switching system.

8. An assembly according to claim 7, wherein said fourth means includes
   fourth synchronous, asynchronous receiver and transmitter means couple to said internal data bus in said second bidirectional communication path, and
   fourth interface means coupled to said data terminal equipment and said fourth synchronous, asynchronous receiver and transmitter means in said second bidirectional communication path, said fourth interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

9. An assembly according to claim 8, wherein said fourth means further includes
   second baud rate generator means coupled to said fourth synchronous, asynchronous receiver and transmitter means to control the flow of data therethrough.

10. An assembly according to claim 2, wherein said computer means includes
    a microprocessor coupled to said internal data bus and an address bus,
    a program read only memory coupled to said internal data bus and said address bus,
    a program random access memory coupled to said internal data bus and said address bus to provide data rate buffering for said selected one of said plurality of different data rates.

11. An assembly according to claim 10, further including
    third means coupled to said switching system and said computer means to provide a second bidirectional communication path between said switching system and said data line card, said third means being controlled by said computer means; and
    fourth means coupled to said computer means, said third means and said data terminal equipment to provide said second bidirectional communication path between said data terminal equipment and said data line card, said fourth means being contolled by said computer means, said second bidirectional communication path being coupled to said first of said data terminal equipment to transmit and receive clocks between said data line card and said first of said data terminal equipment when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

12. An assembly according to claim 11, further including
    digital logic means coupled in common to said first and third means.

13. An assembly according to claim 12, wherein said third means includes
    second decoder means coupled to said switching system to indicate a second time period in which data is received from said switching system for said second bidirectional communication path and transmitted to said switching system from said second bidirectional communication path, third synchronous, asynchronous receiver and transmitter means coupled to said internal data bus, and third interface means coupled to said switching system, said third synchronous, asynchronous receiver and transmitter means and said second decoder means under control of said second decoder means to present input data from said switching system to said internal data bus and to present output data on said second bidirectional communication path from said internal data bus to said switching system.

14. An assembly according to claim 13, wherein said fourth means includes fourth synchronous, asynchronous receiver and transmitter means couple to said internal data bus in said second bidirectional communication path, and fourth interface means coupled to said data terminal equipment and said fourth synchronous, asynchronous receiver and transmitter means in said second bidirectional communication path, said fourth interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

15. An assembly according to claim 14, wherein said fourth means further includes second baud rate generator means coupled to said fourth synchronous, asynchronous receiver and transmitter means to control the flow of data therethrough.

16. A data line card printed board assembly to provide an interface between a switching system and data terminal equipment operating in a selected one of a synchronous mode, an asynchronous mode and a synchronous polled mode and at a selected one of a plurality of different data rates comprising:

first means coupled to said switching system to provide a first bidirectional communication path between said switching systems and said data line card;

second means coupled to said first means and said data terminal equipment to provide said first bidirectional communication path between a first of said data terminal equipment and said data line card; and computer means disposed on said assembly coupled to said first and second means for bidirectional control of said first and second means to accommodate said selected one of said modes and said selected one of said plurality of different data rates;

wherein said first means includes first decoder means coupled to said switching system to indicate a first time period in which data is received from said switching system for said first bidirectional communication path and transmitted to said switching system from said first bidirectional communication path, first synchronous, asynchronous receiver and transmitter means coupled to an internal data bus, and first interface means coupled to said switching system, said first synchronous, asynchronous receiver and transmitter means and said first decoder means under control of said first decoder to present input data from said switching system to said internal data bus and to present output data on said first bidirectional communication path from said internal data bus to said switching system.

17. An assembly according to claim 16, wherein said second means includes second synchronous, asynchronous receiver and transmitter means coupled to said internal data bus in said first bidirectional communication path, and second interface means coupled to said first of said data terminal equipment and said second synchronous, asynchronous receiver and transmitter means to present said input data on said internal data bus in said first bidirectional communication path to said first of said data terminal equipment and to present said output data from said first of said data terminal equipment to said internal data bus.

18. An assembly according to claim 16, wherein said second means further includes first baud rate generator means coupled to said second synchronous, asynchronous receiver and transmitter means to control the flow of data therethrough.

19. An assembly according to claim 18, wherein said computer means includes a microprocessor coupled to said internal data bus and an address bus, a program read only memory coupled to said internal data bus and said address bus, a program random access memory coupled to said internal data bus and said address bus, and a data random access memory coupled to said internal data bus and said address bus to provide data rate buffering for said selected one of said plurality of different data rates.

20. An assembly according to claim 19, further including third means coupled to said switching system and said computer means to provide a second bidirectional communication path between said switching system and said data line card, said third means being controlled by said computer means; and fourth means coupled to said computer means, said third means and said data terminal equipment to provide said second bidirectional communication path between said data terminal equipment and said data line card, said fourth means being contolled by said computer means, said second bidirectional communication path being coupled to said first of said data terminal equipment to transmit and receive clocks between said data line card and said first of said data terminal equipment when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

21. An assembly according to claim 20, further including
digital logic means coupled in common to said first and third means.

22. An assembly according to claim 21, wherein said third means includes
second decoder means coupled to said switching system to indicate a second time period in which data is received from said switching system for said second bidirectional communication path and transmitted to said switching system from said second bidirectional communication path,
third synchronous, asynchronous receiver and transmitter means coupled to said internal data bus, and
third interface means coupled to said switching system, said third synchronous, asynchronous receiver and transmitter means and said second decoder means under control of said second decoder means to present input data from said switching system to said internal data bus and to present output data on said second bidirectional communication path from said internal data bus to said switching system.

23. An assembly according to claim 22, wherein said fourth means includes
fourth synchronous, asynchronous receiver and transmitter means couple to said internal data bus in said second bidirectional communication path, and
fourth interface means coupled to said data terminal equipment and said fourth synchronous, asynchronous receiver and transmitter means in said second bidirectional communication path, said fourth interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

24. An assembly according to claim 23, wherein said fourth means further includes
second baud rate generator means coupled to said fourth synchronous, asynchronous receiver and transmitter means to control the flow of data therethrough.

25. An assembly according to claim 17, wherein said computer means includes
a microprocessor coupled to said internal data bus and an address bus,
a program read only memory coupled to said internal data bus and said address bus,
a program random access memory coupled to said internal data bus and said address bus, and
a data random access memory coupled to said internal data bus and said address bus to provide data rate buffering for said selected one of said plurality of different data rates.

26. An assembly according to claim 25, further including
third means coupled to said switching system and said computer means to provide a second bidirectional communication path between said switching system and said data line card, said third means being controlled by said computer means; and
fourth means coupled to said computer means, said third means and said data terminal equipment to provide said second bidirectional communication path between said data terminal equipment and said data line card, said fourth means being contolled by said computer means, said second bidirectional communication path being coupled to said first of said data terminal equipment to transmit and receive clocks between said data line card and said first of said data terminal equipment when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

27. An assembly according to claim 26, further including
digital logic means coupled in common to said first and third means.

28. An assembly according to claim 27, wherein said third means includes
second decoder means coupled to said switching system to indicate a second time period in which data is received from said switching system for said second bidirectional communication path and transmitted to said switching system from said second bidirectional communication path,
third synchronous, asynchronous receiver and transmitter means coupled to said internal data bus, and
third interface means coupled to said switching system, said third synchronous, asynchronous receiver and transmitter means and said second decoder means under control of said second decoder means to present input data from said switching system to said internal data bus and to present output data on said second bidirectional communication path from said internal data bus to said switching system.

29. An assembly according to claim 28, wherein said fourth means includes
fourth synchronous, asynchronous receiver and transmitter means couple to said internal data bus in said second bidirectional communication path, and
fourth interface means coupled to said data terminal equipment and said fourth synchronous, asynchronous receiver and transmitter means in said second bidirectional communication path, said fourth interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

30. An assembly according to claim 29, wherein said fourth means further includes
second baud rate generator means coupled to said fourth synchronous, asynchronous receiver and transmitter means to control the flow of data therethrough.

31. A data line card printed board assembly to provide an interface between a switching system and data terminal equipment operating in a selected one of a synchronous mode, an asynchronous mode and a synchronous polled mode and at a selected one of a plurality of different data rates comprising:

first means coupled to said switching system to provide a first bidirectional communication path between said switching systems and said data line card;

second means coupled to said first means and said data terminal equipment to provide said first bidirectional communication path between a first of said data terminal equipment and said data line card; and computer means disposed on said assembly coupled to said first and second means for bidirectional control of said first and second means to accommodate said selected one of said modes and said selected one of said plurality of different data rates;

wherein said first means includes first synchronous, asynchronous receiver and transmitter means coupled to an internal data bus in said first bidirectional communication path, and first interface means coupled to said first of said data terminal equipment and said synchronous, asynchronous receiver and transmitter means to present input data on said internal data bus to said first of said data terminal equipment and to present output data from said first of said data terminal equipment to said internal data bus.

32. An assembly according to claim 31, further including third means coupled to said switching system and said computer means to provide a second bidirectional communication path between said switching system and said data line card, said third means being controlled by said computer means; and fourth means coupled to said computer means, said third means and said data terminal equipment to provide said second bidirectional communication path between said data terminal equipment and said data line card, said fourth means being contolled by said computer means, said second bidirectional communication path being coupled to said first of said data terminal equipment to transmit and receive clocks between said data line card and said first of said data terminal equipment when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

33. An assembly according to claim 32, wherein said third means includes decoder means coupled to said switching system to indicate a time period in which data is received from said switching system for said second bidirectional communication path and transmitted to said switching system from said second bidirectional communication path, second synchronous, asynchronous receiver and transmitter means coupled to an internal data bus, and second interface means coupled to said switching system, said second synchronous, asynchronous receiver and transmitter means and said decoder means under control of said decoder means to present input data from said switching system to said internal data bus and to present output data on said second bidirectional communication path from said internal data bus to said switching system.

34. An assembly according to claim 33, wherein said fourth means includes third synchronous, asynchronous receiver and transmitter means coupled to said internal data bus in said second bidirectional communication path, and third interface means coupled to said data terminal equipment and said third synchronous, asynchronous reeivr and trnsmitter means in said second bidirectional communication path, said third interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

35. An assembly to claim 34, wherein said fourth means further includes baud rate generator means coupled to said third synchronous, asynchronous receiver and transmitter means to control the flow of data therethrough.

36. An assembly according to claim 32, further including digital logic means coupled in common to said first and third means.

37. A data line card printed board assembly to provide an interface between a switching system and data terminal equipment operating in a selected one of a synchronous mode, an asynchronous mode and a synchronous polled mode and at a selected one of a plurality of different data rates comprising:

first means coupled to said switching system to provide a first bidirectional communication path between said switching systems and said data line card;

second means coupled to said first means and said data terminal equipment to provide said first bidirectional communication path between a first of said data terminal equipment and said data line card; and computer means disposed on said assembly coupled to said first and second means for bidirectional control of said first and second means to accomodate said selected one of said modes and said selected one of said plurality of different data rates;

wherein said computer means includes a microprocessor coupled to an internal bus and an address bus, a program read only memory coupled to said internal data bus and said address bus, a program random access memory coupled to said internal data bus and said address bus, and a data random access memory coupled to said internal data bus and said address bus to provide data rate buffering for said selected one of said plurality of different data rates.

38. A data line card printed board assembly to provide an interface between a switching system and data terminal equipment operating in a selected one of a synchronous mode, an asynchronous mode and a synchronous polled mode and at a selected one of a plurality of different data rates comprising:
- first means coupled to said switching system to provide a first bidirectional communication path between said switching systems and said data line card;
- second means coupled to said first means and said data terminal equipment to provide said first bidirectional communication path between a first of said data terminal euqipment and said data line card;
- computer means disposed on said assembly coupled to said first and second means for bidirectional control of said first and second means to accommodate said selected one of said modes and said selected one of said plurality of different data rates;
- third means coupled to said switching system and said computer means to provide a second bidirectional communication path between said switching system and said data line card, said third means being controlled by said computer means; and
- fourth means coupled to said computer means, said third means and said data terminal equipment to provide said second bidirectional communication path between said data terminal equipment and said data line card, said fourth means being controlled by said computer means, said second bidirectional communication path being coupled to said first of said data terminal equipment to transmit and receive clocks between said data line card and said first of said data terminal when said first of said data terminal equipment operates in and said computer means is programmed for a selected one of said synchronous mode and said synchronous polled mode and said second bidirectional communication path being coupled to a second of said data terminal equipment to interface said data line card to two of said data terminal equipment when both of said first and second of said data terminal equipment are operating in and said computer means is programmed for said asynchronous mode.

39. An assembly according to claim 38, wherein said third means includes
- decoder means coupled to said switching system to indicate a time period in which data is received from said switching system for said second bidirectional communication path and transmitted to said switching system from said second bidirectional communication path,
- first synchronous, asynchronous receiver and transmitter means coupled to an internal data bus, and
- first interface means coupled to said switching system, said first synchronous, asynchronous receiver and transmitter means and said decoder means under control of said decoder means to present input data from said switching system to said internal data bus and to present output data on said second bidirectional communication path from said internal data bus to said switching system.

40. An assembly according to claim 39, wherein said fourth means includes
- second synchronous, asynchronous receiver and transmitter means coupled to said internal data bus in said second bidirectional communication path, and
- second interface means coupled to said data terminal equipment and said second synchronous, asynchronous receiver and transmitter means in said second bidirectional communication path, said second interface means presenting said input data in said second bidirectional communication path on said internal data bus to said second of said data terminal equipment and to present said output data on said second bidirectional communication path from said second of said data terminal equipment to said internal data bus when said first and second data terminal equipment are operating in said asynchronous mode.

41. An assembly according to claim 40, wherein said fourth mean further includes
- baud rate generator means coupled to said second synchronous, asynchronous receiver and transmitter means to control the flow of data therethrough.

42. An assembly according to claim 39, further including
- digital logic means coupled in common to said first and third means.

* * * * *